(12) United States Patent
Akyildiz

(10) Patent No.: US 11,603,784 B2
(45) Date of Patent: *Mar. 14, 2023

(54) EXHAUST SYSTEM AND FEATURES THEREOF

(71) Applicant: ECC TEC MSJ Incorporated, Boca Raton, FL (US)

(72) Inventor: Saban Akyildiz, Boca Raton, FL (US)

(73) Assignee: ECC TEC MSJ INCORPORATED, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,920

(22) Filed: Oct. 18, 2021

(65) Prior Publication Data

US 2022/0034248 A1 Feb. 3, 2022

Related U.S. Application Data

(63) Continuation of application No. 17/322,768, filed on May 17, 2021, now Pat. No. 11,149,607, which is a
(Continued)

(51) Int. Cl.
*F01N 3/20* (2006.01)
*B01J 23/38* (2006.01)
(Continued)

(52) U.S. Cl.
CPC ....... *F01N 3/2013* (2013.01); *B01D 46/0034* (2013.01); *B01J 23/38* (2013.01);
(Continued)

(58) Field of Classification Search
None
See application file for complete search history.

(56) References Cited

U.S. PATENT DOCUMENTS 3,956,614 A 5/1976 Hervert
5,063,029 A 11/1991 Mizuno et al.
(Continued)

FOREIGN PATENT DOCUMENTS

CN 2597684 Y 1/2004
CN 205948865 U 2/2017
(Continued)

OTHER PUBLICATIONS

Mohit A. Bagul et al., "Emission Reduction using Magnetic Pollution Filter", International Journal of Innovative Research in Science, Engineering and Technology, vol. 5, Issue 7, Jul. 2016.
(Continued)

*Primary Examiner* — Jelitza M Perez
(74) *Attorney, Agent, or Firm* — Dentons US LLP

(57) ABSTRACT

An exhaust system that includes a catalytic converter, selective catalytic reduction system, a muffler and, for certain applications, a diesel particulate filter that each include at least one filter that has an electric heating element, a metallic coating and a plurality of metal rods extending therethrough. The combination of elements are configured to heat the internal housings of the exhaust system and disrupt the direction of flow of exhaust gases which contain harmful toxic gases and pollutants and aid in removing and/or reducing said toxic gases and pollutants.

18 Claims, 21 Drawing Sheets

Related U.S. Application Data continuation of application No. 16/896,137, filed on Jun. 8, 2020, now Pat. No. 11,035,272, which is a continuation-in-part of application No. 16/625,074, filed as application No. PCT/US2019/063387 on Nov. 26, 2019, which is a continuation of application No. 16/664,172, filed on Oct. 25, 2019, now abandoned.

(51) Int. Cl.

| | | |
|---|---|---|
| *F01N 3/28* | (2006.01) | |
| *F01N 3/08* | (2006.01) | |
| *B01J 35/04* | (2006.01) | |
| *B01D 46/00* | (2022.01) | |
| *F01N 3/035* | (2006.01) | |

(52) U.S. Cl.
CPC .............. *B01J 35/04* (2013.01); *F01N 3/035* (2013.01); *F01N 3/0892* (2013.01); *F01N 3/28* (2013.01); *F01N 3/2892* (2013.01)

(56) References Cited

U.S. PATENT DOCUMENTS

| | | | |
|---|---|---|---|
| 5,234,668 A | 8/1993 | Harada et al. | |
| 5,264,186 A | 11/1993 | Harada et al. | |
| 5,423,904 A | 6/1995 | Dasgupta | |
| 5,465,573 A | 11/1995 | Abe et al. | |
| 5,569,455 A | 10/1996 | Fukui et al. | |
| 5,582,805 A | 12/1996 | Yoshizaki et al. | |
| 6,585,940 B2 | 7/2003 | Abe et al. | |
| 8,309,032 B2 | 11/2012 | Plati et al. | |
| 9,383,119 B2 | 7/2016 | Kida et al. | |
| 11,149,607 B2 * | 10/2021 | Akyildiz | B01D 46/0034 |
| 2001/0043890 A1 | 11/2001 | Son | |
| 2002/0053283 A1 * | 5/2002 | Akyildiz | F23J 15/025 95/28 |
| 2004/0118111 A1 | 6/2004 | Covit | |
| 2006/0204408 A1 | 9/2006 | Son | |
| 2009/0074630 A1 * | 3/2009 | Gonze | F01N 13/009 422/174 |
| 2011/0162348 A1 | 7/2011 | Kim et al. | |

FOREIGN PATENT DOCUMENTS

| | | |
|---|---|---|
| CN | 206762544 U | 12/2017 |
| DE | 102009014371 A1 | 9/2010 |
| EP | 0153157 A2 | 8/1985 |
| GB | 2512845 A | 10/2014 |
| JP | 2009097359 A | 5/2009 |
| WO | 2017198292 | 11/2017 |

OTHER PUBLICATIONS

Ali S. Faris et al., "Effects of Magnetic Field on Fuel Consumption and Exhaust Emissions in Two-Stroke Engine", Energy Procedia, vol. 18, pp. 327-338, 2012.

Karthik Dhayakar et al., "Effect of Twin Sparkplug in Two Stroke IC Engine", International Journal of Science and Research (IJSR), vol. 4, Issue 2, pp. 2147-2153, Feb. 2015.

Adel Mahmmod Salih et al., "The effect of magnetic field on the boiler performance fueled with diesel", International Journal of Scientific & Engineering Research (IJSER), vol. 7, Issue 2, pp. 406-410, Feb. 2016.

H. R. Jackson et al., "Catalytic NOx Reduction Studies", SAE Technical Paper, 730568, 1973, doi: 10.4271/730568.

International Search Report and Written Opinion, U.S. Patent and Trademark Office, Application No. PCT/US2019/063387, dated Feb. 7, 2020.

* cited by examiner

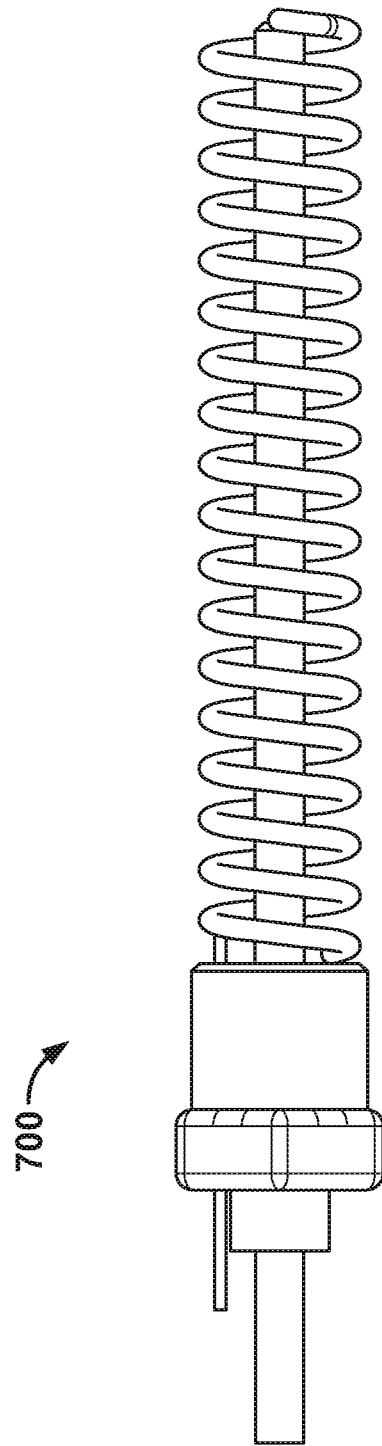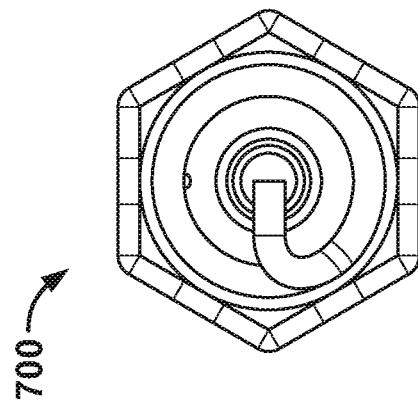
FIG. 13A
FIG. 13B

EXHAUST SYSTEM AND FEATURES THEREOF

CROSS-REFERENCE TO RELATED APPLICATION

This application is a Continuation of U.S. patent application Ser. No. 17/322,768, filed May 17, 2021, which is a Continuation of U.S. patent application Ser. No. 16/896,137, filed Jun. 8, 2020, now U.S. Pat. No. 11,035,272, which is a Continuation-In-Part of U.S. patent application Ser. No. 16/625,074, filed Dec. 20, 2019, which is a National Stage Application of International Application No. PCT/US19/63387, filed Nov. 26, 2019, which is a Continuation of U.S. patent application Ser. No. 16/664,172, filed Oct. 25, 2019, now Abandoned, the disclosures of which are hereby incorporated by reference in their entirety as part of the present disclosure.

FIELD OF THE INVENTION

The present invention relates generally to exhaust systems and more particularly to improvements to exhaust systems to remove and/or reducing harmful exhaust gases, particulate matter and other debris that are emitted from an engine.

BACKGROUND OF THE INVENTION

Exhaust systems for fossil fuel burning internal combustion engine typically include at least catalytic converter and a muffler connected to the catalytic converter. It is noted that in addition to vehicles such as automobiles, trucks and buses, exhaust systems that include a catalytic converter can include, but are not limited to, electrical generators, forklifts, mining equipment, trains, motorcycles, jet skis, snow mobiles, leaf blowers, airplanes, atvs, wood stoves to control emissions, etc.

A catalytic converter is configured to reduce and/or convert toxic gases and pollutants of exhaust gas into less toxic pollutants by catalyzing a redox reaction (oxidation or reduction). Commonly, catalytic converters include a filter that is comprised of ceramic and has honeycomb-shaped openings. In applications where particularly high heat resistance is required, metallic foil monolithic filters made of Kanthal (FeCrAl) are commonly used. Catalytic converters can include a washcoat comprised of aluminum oxide, titanium dioxide, silicon dioxide, or a mixture of silica and alumina. The washcoat materials are selected to form a rough, irregular surface, which greatly increases the surface area compared to the smooth surface of the bare substrate. This in turn maximizes the catalytically active surface available to react with the engine exhaust.

Since the early 1980's, "three-way" (oxidation-reduction) catalytic converters have been used in vehicle emission control systems in the United States and Canada. Many other countries have also adopted stringent vehicle emission regulations that in effect require three-way converters on gasoline-powered vehicles. The reduction and oxidation catalysts are typically contained in a common housing. However, in some instances, they may be housed separately. A three-way catalytic converter has three simultaneous tasks:

(1) Reduction of nitrogen oxides to nitrogen and oxygen: $NO_x \rightarrow O_2 + N_2$;
(2) Oxidation of carbon monoxide to carbon dioxide: $CO + O_2 \rightarrow CO_2$; and
(3) Oxidation of unburnt hydrocarbons to carbon dioxide and water: $C_xH_{2x+2} + [(3x+1)/2]O_2 \rightarrow xCO_2 + (x+1)H_2O$.

Three-way catalysts are effective when the engine is operated within a narrow band of air-fuel ratios near stoichiometry such that the exhaust gas oscillates between rich (excess fuel) and lean (excess oxygen) conditions, which is between 14.6 and 14.8 parts air to 1 part fuel by weight for gasoline. The ratio for liquefied petroleum gas (LPG), natural gas and ethanol fuels is each slightly different, requiring modified fuel system settings when using those fuels. However, conversion efficiency falls very rapidly when the engine is operated outside of that band of air-fuel ratios. Under lean engine operation, there is excess oxygen and the reduction of NOx is not favored. Under rich conditions, the excess fuel consumes all of the available oxygen prior to the catalyst, thus only stored oxygen is available for the oxidation function. Closed-loop control systems are necessary because of the conflicting requirements for effective $NO_x$ reduction and HC oxidation. The control system must prevent the $NO_x$ reduction catalyst from becoming fully oxidized, yet replenish the oxygen storage material to maintain its function as an oxidation catalyst.

U.S. Pat. No. 5,180,559, for example, is concerned with the inefficiency of catalytic converters at low temperature, particularly during light-off time when an engine is first started and is directed to a method for reducing the light off time that comprises exposing the matrix of the converter to an alternating magnetic field or to electromagnetic radiation having such a frequency that the wash coat and the particles of catalyst supported by the matrix are heated to the light-off temperature without a corresponding increase in the temperature of the entire matrix. Static magnetic fields are not used once the materials have been heated.

SUMMARY OF THE INVENTION

The present invention is generally directed to improvements to an exhaust system to reduce and/or eliminate harmful gases, debris and particulate matter.

In an embodiment, the present invention is directed to a catalytic converter that includes heating elements and a filter or support lattice coated with a catalytic material. Disruptor plates that add agitation to the flow of exhaust gases across the filter/support lattice and have an array of holes arranged across the direction of flow of the exhaust gases can be located at inlet and outlet ports to. The array of holes forms a pseudorandom pattern. The disruptor plates are oriented orthogonal to the longitudinal axis of the external shell.

In an embodiment, a catalytic converter can include a filter or support lattice through which a magnetic field is maintained to aid in the circulation of exhaust gases and other particulates in a catalytic converter. There can be an outer shell at least partially surrounding the external shell of a catalytic converter with a plurality of magnets located between the shells. The magnets can, for example, have a curved shape and/or can be arranged in sets. The magnets may lie in an array having alternating polarities. Magnets that face each other may also have opposing. Alternatively, magnets can have the same polarity and the polarity might not vary along the longitudinal direction of the converter. An array of magnets may be placed to abut the external shell from inside the shell and there may be a central core magnetic rod.

In an embodiment, the present invention is directed to an exhaust system comprising a catalytic converter, a selective catalytic reduction system and a muffler. The catalytic converter can includes a housing in which an electric heating element is at least partially arranged and in which a filter is arranged that has a metallic coating and includes a plurality of metal rods extending therethrough. The selective catalytic reduction system includes a housing in which an electric heating element is at least partially arranged and in which a filter is arranged that has a metallic coating and includes a plurality of metal rods extending therethrough.

The catalytic converter can include two filters, a first filter and a second filter arranged therein. The housing of the catalytic converter can include a first housing and a second housing that is spaced from and arranged within the first housing and a plurality of magnets arranged between the first housing and the second housing. The filter of the selective catalytic reduction system can include a plurality of magnets arranged therein. The muffler can include a housing and a plurality of plates that have a metallic coating and are spaced from each other within the housing.

In an embodiment, the present invention is directed to an exhaust system comprising a catalytic converter that includes a housing in which an electric heating element is at least partially arranged and in which a filter is arranged that has a metallic coating and includes a plurality of metal rods extending therethrough, a diesel particulate filter that includes a housing in which an electric heating element is at least partially arranged and in which a filter is arranged that has a metallic coating and includes a plurality of metal rods extending therethrough, a selective catalytic reduction system that includes a housing in which an electric heating element is at least partially arranged and in which a filter is arranged that has a metallic coating and includes a plurality of metal rods extending therethrough and a muffler.

BRIEF DESCRIPTION OF THE DRAWINGS

FIGS. 13A and 13B are a perspective and end view of a coil heather that can represent at least one heater included in a catalytic converter system of the present disclosure;

FIGS. 15A and 15B are perspective views of magnets that are arranged in the catalytic converter and a selective catalytic reduction system of the exhaust system of FIG. 15;

DETAILED DESCRIPTION OF EMBODIMENTS OF THE INVENTION

With reference now to the drawings, and in particular to FIGS. 1-30, embodiments of exhaust systems and associated features thereof embodying the principles and concepts of the present invention will be described.

Figure 1:
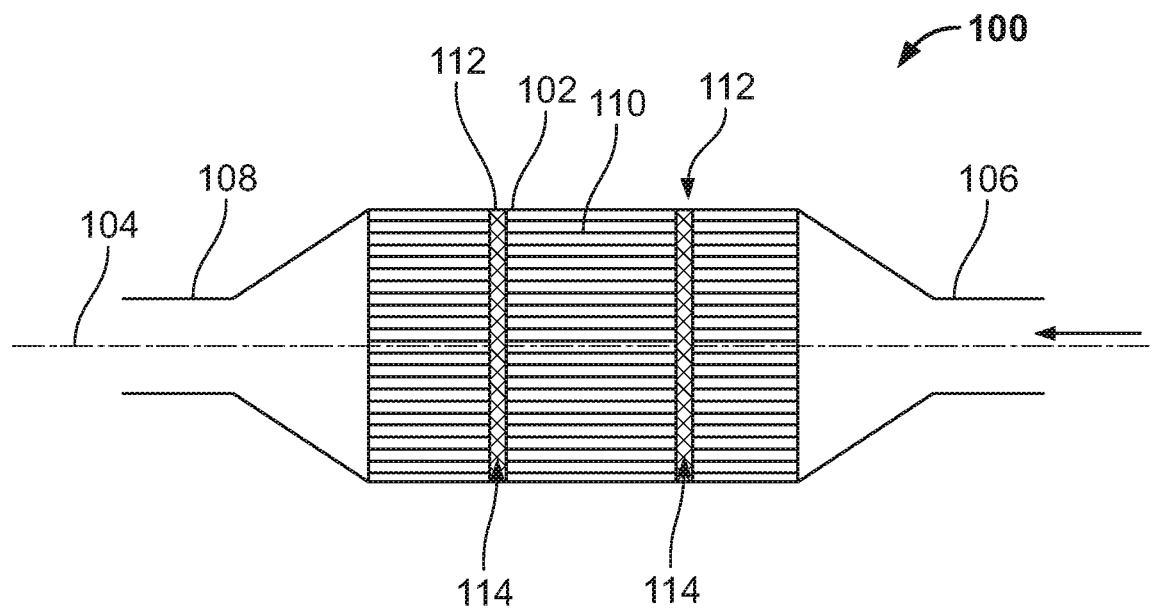
FIG. 1 is a cross-sectional view of a known catalytic converter.
Figure 2:
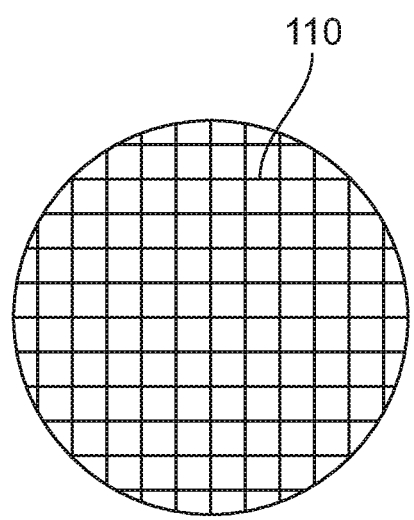
FIG. 2 is a side view of a support lattice of the catalytic converter of FIG. 1.

FIG. 1 illustrates a cross-sectional view of a catalytic converter 100 that extends along a longitudinal axis 104 and comprises an external shell 102, an inlet port 106 and an outlet port 108. Internal to the external shell 102 is a filter 110 a internal support lattice that can be divided into sections by spaces 112. Heating elements 114, which are configured to heat the internal temperature of the catalytic converter 100, can be arranged within the spaces 112 of the lattice. The heating elements 114 are configured to heat the internal temperature of the catalytic converter 100 which in turn aids in the removal of harmful gases and particulate matter within the catalytic converter 100. The filter 110 (see FIG. 2 for end view thereof) is coated with a catalytic material to maximize contact with toxic gases and particulates and slow down the flow of these gases and particulates from the inlet port 106 to the outlet port 108 to allow the heating elements to further aid in the removal of harmful gases and particulate matter within the catalytic converter 100.

The coating must retain its surface area and prevent sintering of the catalytic metal particles even at high temperatures (1000° C.). The catalyst itself, most often is a mix of precious metals. Platinum is the most active catalyst. However, it is not suitable for all applications because of unwanted additional reactions and high cost. Palladium and rhodium are two other precious metals used. Rhodium is used as a reduction catalyst and palladium is used as an oxidation catalyst. Platinum can be used both for reduction and oxidation. Cerium, iron, manganese and nickel are also used, although each has limitations. Nickel is not legal for use in the European Union because of its reaction with carbon monoxide into toxic nickel tetracarbonyl. Copper can be used everywhere except North America, where its use is illegal because of the formation of toxic dioxin.

Figure 3:
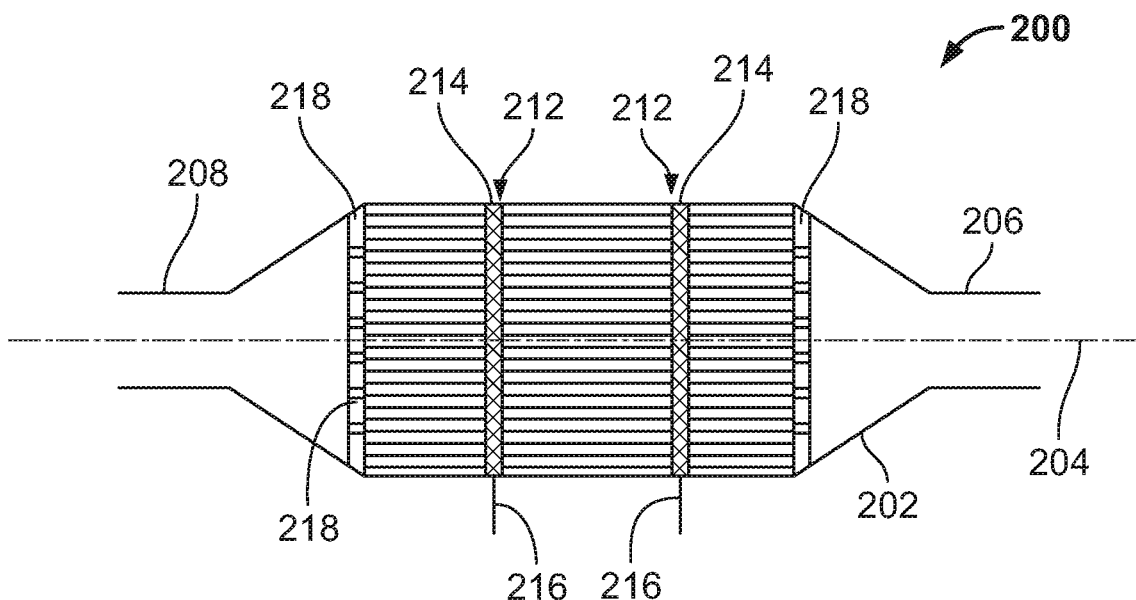
FIG. 3 is a cross-sectional view of a known catalytic converter with disrupter plates.

FIG. 3 illustrates another exemplary embodiment of a catalytic converter 200 with electrical heating elements 214 arranged in spaces 212. Electrical leads 216 extend from and supply energy to the heating elements 214, which can be, for example, constructed of nichrome wire. It is noted that electrical leads 216 can also be used to supply energy to the heating elements 114 as depicted in FIG. 1. Here, disruptor plates 218 are placed near an inlet port 206 and an outlet port 208. The disruptor plates 218 are included to add agitation to the flow of exhaust gases across a filter 210 that includes a support lattice. The support lattice of the filter 210, similar to the support lattice of the filter 110 shown in FIG. 1, is coated with a catalytic material to maximize contact with toxic gases and particulates and further aid in slowing down the flow of these gases within the catalytic converter and allow for the heating elements to at least further reduce harmful gases and particulate matter.

Figure 4A:
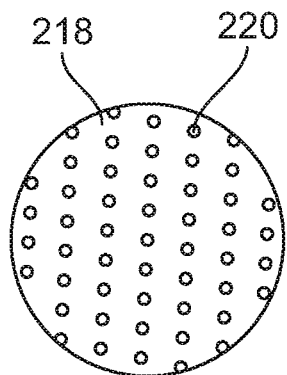
FIGS. 4A-4C are side views of the disruptor plates of the catalytic converter of FIG. 3.
Figure 4B:
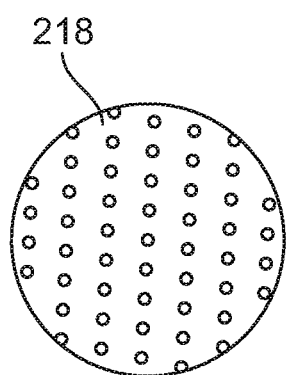
Figure 4C:
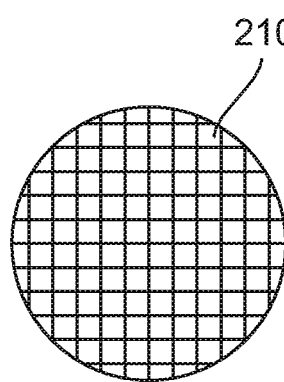

FIGS. 4A-4C shows an end view of a disrupter plate 218 that includes of an array of holes 220 that extend across the direction of flow of the exhaust gases. The array of holes are scattered about the plate 218 and are termed a pseudorandom pattern. As shown in FIG. 3, the disruptor plates 218 are oriented orthogonal to a longitudinal axis 204 of an external shell 202.

Figure 5:
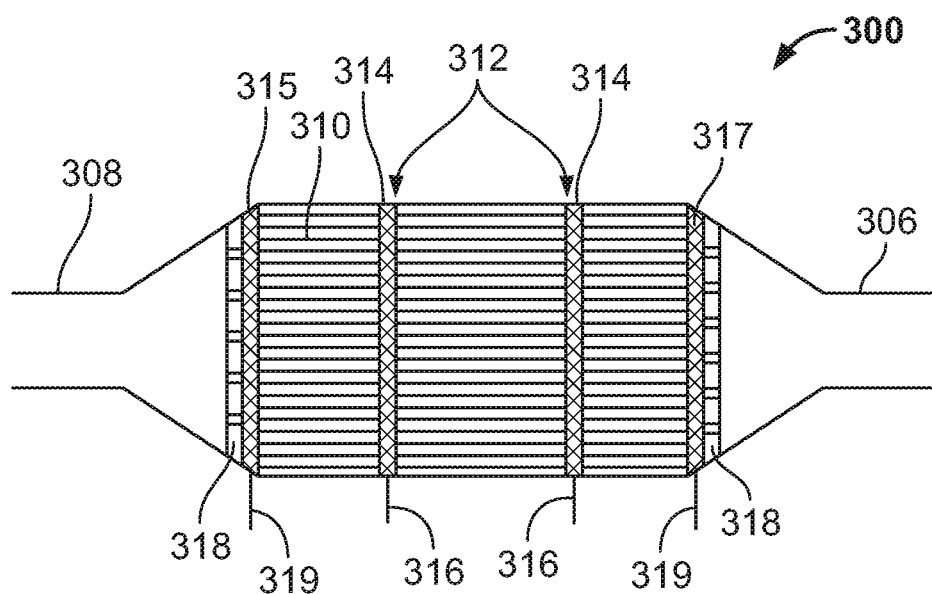
FIG. 5 is a cross-sectional view of a catalytic converter with supplemental heating elements and disruptor plates according to an exemplary embodiment of the present disclosure.

FIG. 5 depicts another exemplary embodiment of a catalytic converter 300 of the present invention. The catalytic converter 300 includes heating elements 314 arranged in openings 312 of the support lattice 310 of the filter with electrical leads 316 extending therefrom to supply power to the heating elements 314 and secondary planar heating elements 315, 317 that are arranged near an inlet port 306 and/or an outlet port 308, adjacent to disruptor plates 318. Additional electrical leads 319 supply energy to the secondary planar heating elements 315, 317. Although some of the various elements are described as planar or having particular orientations, it is not required that these geometrical restrictions be exact, and approximations thereto are within the description of the various embodiments. Disruption of normal, substantially lamellar flow of exhaust gases can lead to an enhancement of the efficiency of the catalytic converter 300. As such, by including multiple heating elements 314, 315, 317 and disrupter plates 318 the reduction of toxic gases and particulate matter exiting a catalytic converter is greatly reduced.

The secondary heating elements 315, 317 can also be placed near the support lattice of the filter 310 in addition to or in place of near the inlet port 306 and/or outlet port 308.

The catalytic converter 300 aids in destroying and removing harmful gases and particulate matter as they pass through the catalytic converter 300.

The secondary heating elements 315, 317 can be configured to heat the internal temperature of the catalytic converter 300 to about 800° C. to 1200° C. which aids in the removal of harmful gases and particulate matter within the catalytic converter 300. The support lattice of the filter 310 (see also FIG. 11) can be coated or sprayed with noble metals to aid in maintaining an internal temperature of about 800° C. to 1200° C. and in turn aid further in the removal of harmful gases and particulate matter.

Figure 6:
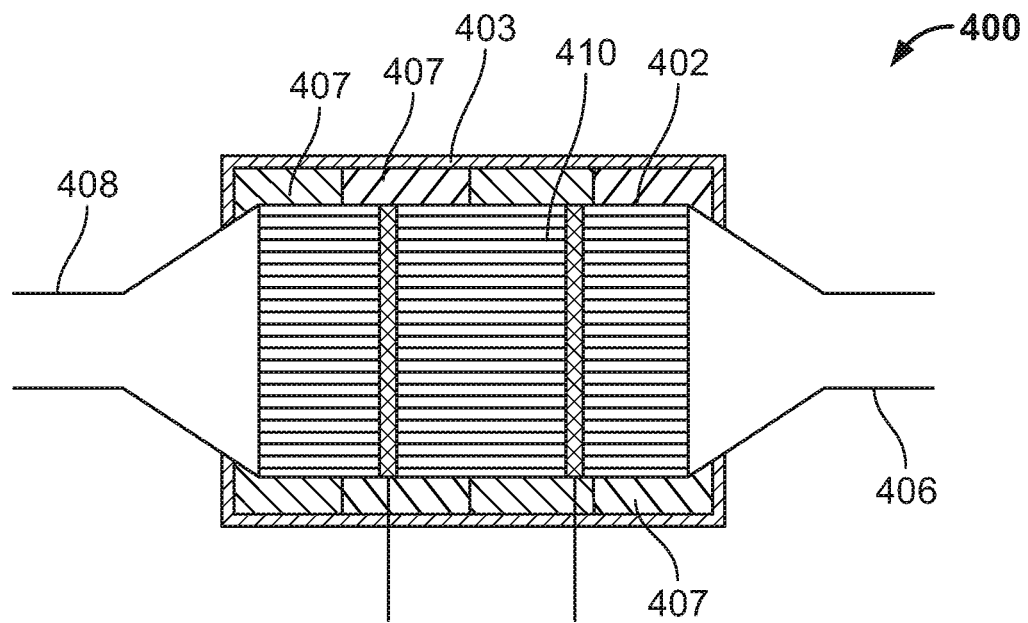
FIG. 6 is a cross-sectional view of a catalytic converter that includes external magnets.
Figure 7:
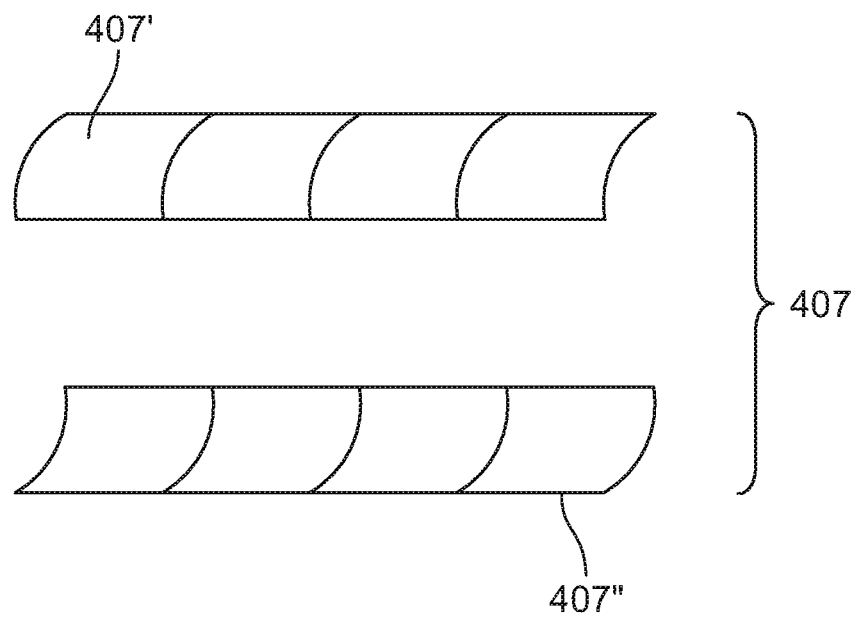
FIG. 7 is an arrangement of the external magnets.

FIG. 6 illustrates yet another exemplary embodiment of a catalytic converter 400 that includes a filter 410 with a support lattice through which a magnetic field is maintained between an inlet port 406 and an outlet port 408. Here, the catalytic converter 400 is enhanced with an encompassing shell 402 partially surrounding an external shell 403. A plurality of magnets 40 are located between the shells 402, 403. As shown in FIG. 7, the magnets 407 may have a curved shape to approximate the outer geometry of the external shell 403 and may be provided in two sets 407', 407". The magnets 407 may lie in an array having alternating polarities as shown in FIG. 7. Magnets 407 that face each other may also have opposing polarity although that is not required. Alternatively, the magnets 407 can have the same polarity and the polarity might not vary along the longitudinal direction of the converter 400. Having opposite polarity facing each other will result in the stronger magnetic field.

It is noted that the electrical leads 316, 416 are attached to a control unit (see FIG. 10) 421 that is capable of switching between the heating units 415, 417 (and 315, 317) and maintaining a desired temperature, as desired at between about 6 to 45 amps.

Figure 8:
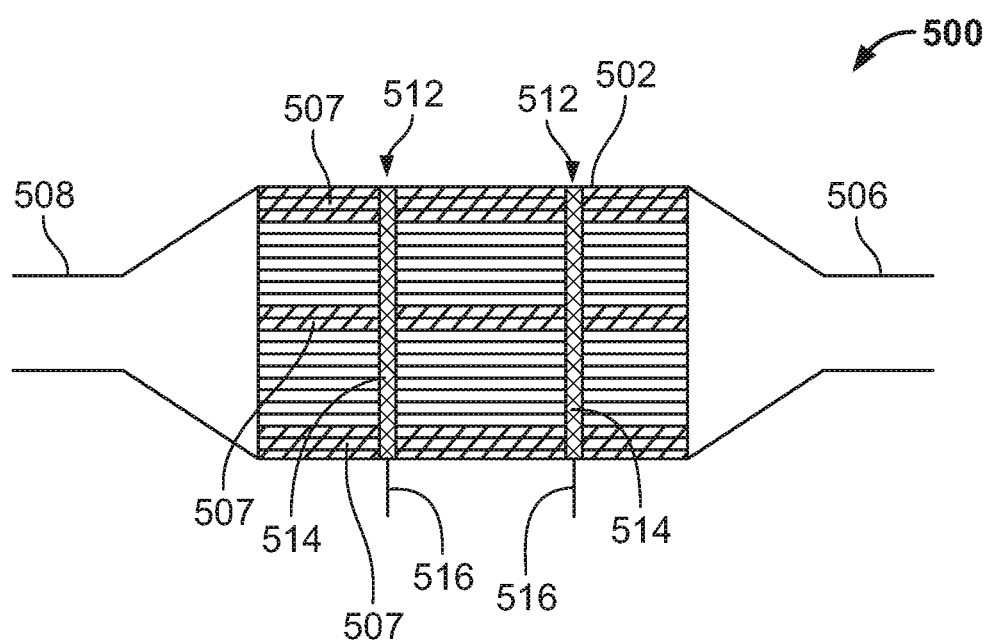
FIG. 8 is a cross-sectional view of a catalytic converter that includes internal magnets according to an exemplary embodiment of the present disclosure.

FIG. 8 shows another exemplary embodiment of a catalytic converter 500 of the present disclosure in which an array of magnets 507 are placed to abut an external shell 502 from inside the shell 502. Similar to other embodiments, heating elements 514 are arranged in openings 512 of a support lattice of a filter 510 with electrical leads that power the heating elements 514 extending from the heating elements 514.

Figure 9A:
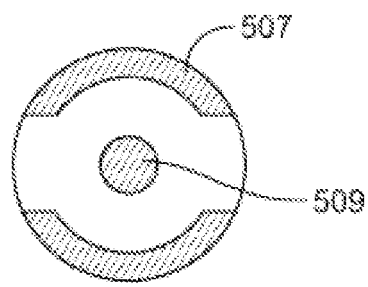
FIG. 9A is a cross-sectional view of one of the internal magnets of the catalytic converter of FIG. 8.
Figure 9B:
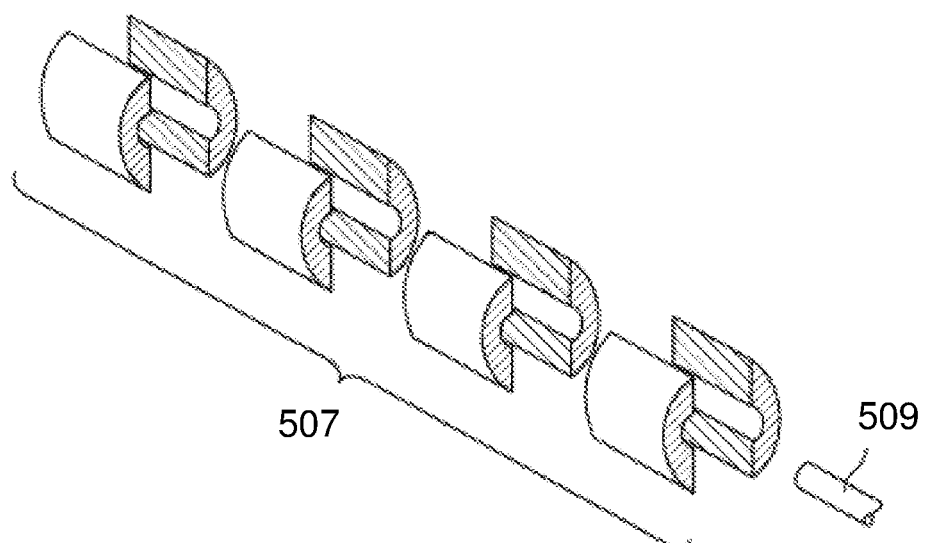
FIG. 9B is an exploded view of the internal magnets of the catalytic converter of FIG. 8.

FIG. 9A an end view of the magnets 507 and FIG. 8B depicts an exploded view of the magnets 507. It is noted that there may be a central core magnetic rod 509 as part of the set of magnets 507. Such a core 509 is not essential, but increases the possibility for different arrangements of polarity of the magnets 507. For example, the outer magnets 507 that face each other may have the same or different polarities, which may vary along the longitudinal direction. In addition, the core magnetic rod 509 may be one piece extending from the inlet port 506 to the outlet port 508, with one polarity at each end or it may be made of segments that are separated from each other in the longitudinal direction and have polarities that vary in the longitudinal direction. Although the magnets 507 have been depicted as fixed magnets, they may also be electromagnets maintained by current sources (not shown).

Figure 10:
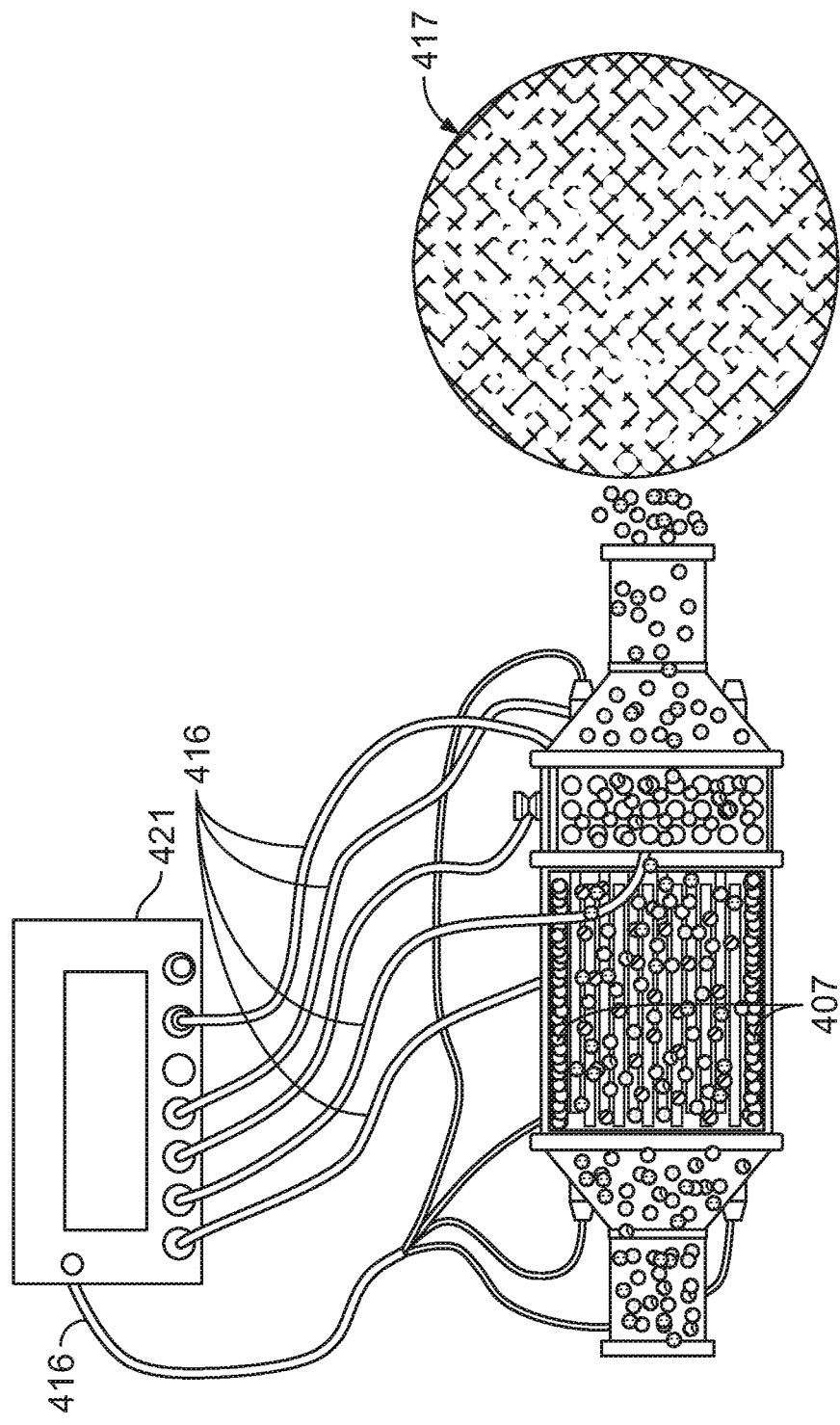
FIG. 10 is a partial cross-sectional view of an internal system of a catalytic converter that includes heaters and electrical systems related thereto according to an exemplary embodiment of the present disclosure.

FIG. 10 depicts electronic connections of a catalytic converter.

Figure 11:
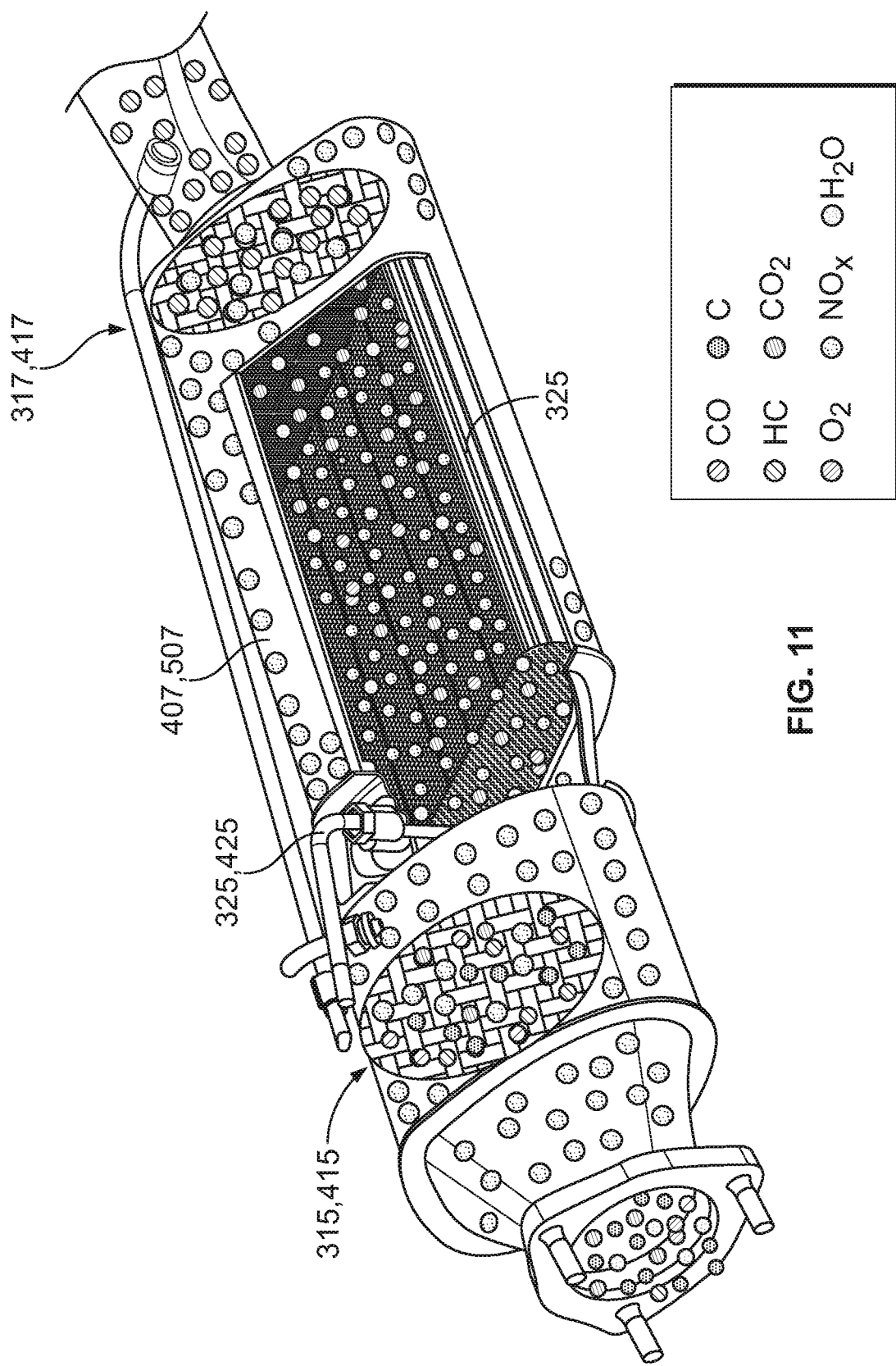
FIG. 11 is a partial cross-sectional view of the catalytic convert of FIG. 10 showing internal electrical heaters according to an exemplary embodiment of the present disclosure.

As shown in FIG. 11, temperature sensors 325, 425 can be placed near the additional heaters 315, 415, 317, 417 to aid in ensuring proper internal temperature is maintained.

Figure 12:
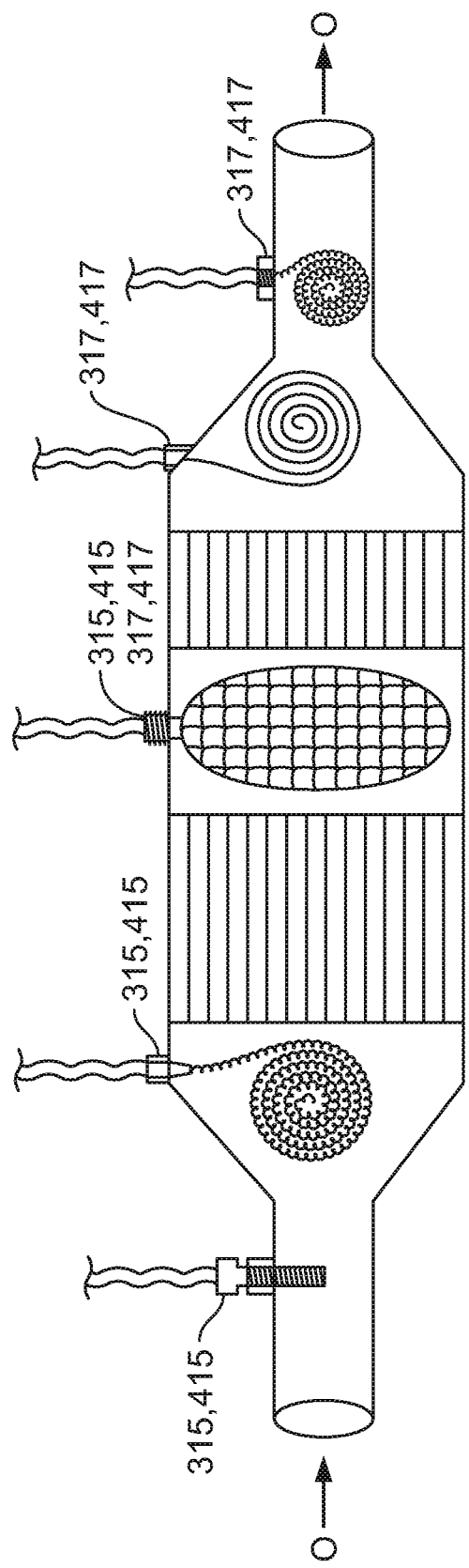
FIG. 12 is a cross-sectional view of a catalytic convert of showing various possible locations of internal electrical heaters according to an exemplary embodiment of the present disclosure.

FIG. 12 depicts an exemplary embodiment of a catalytic converter of the present invention indicating that secondary heaters 315, 415, 317, 417 can be placed at various locations within the catalytic converter and any number of secondary heaters can be used depending on the size of the unit.

FIGS. 13A and 13B depict an embodiment of one type of additional heater 700 that that can be inserted into a catalytic converter from the outside thereof and screwed in place. As such, the heater 600 is removal if needed.

Figure 14:
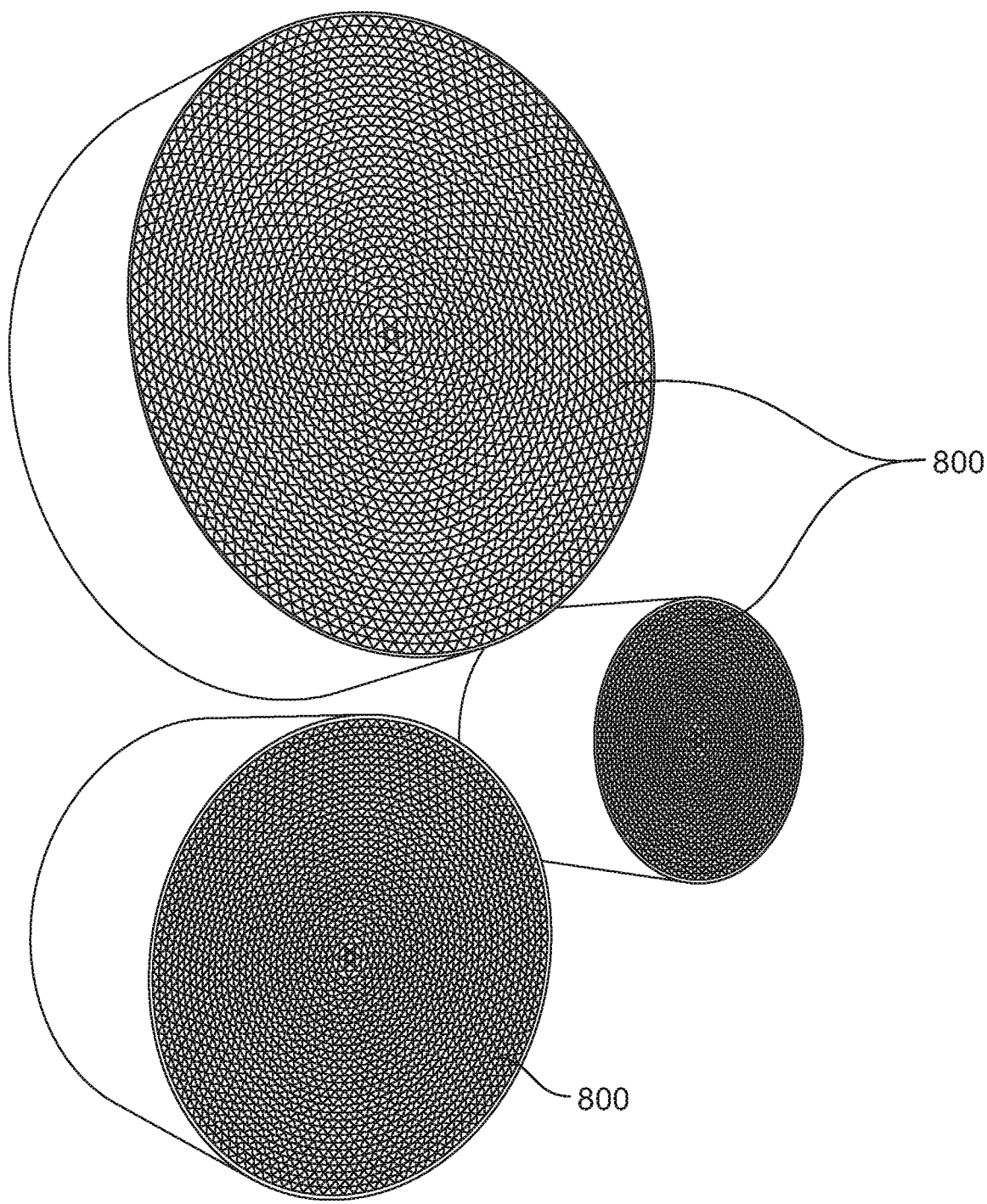
FIG. 14 is an exemplary embodiment of another heater that can be arranged within catalytic converter.

FIG. 14 depicts another embodiment of an additional heater 800 that that can arranged in a catalytic converter.

In use, the catalytic converter 100, 200, 300, 400, 500 is placed so that gases to be treated flow from the inlet port 106, 206, 306, 406, 506 through disruptor plates 318 (in some embodiments), through a secondary heating element 114, 214, 314, 414, 515 and enter a volume in which they are subjected both to additional heating in some embodiments from additional heaters 317, 318 and magnetic fields by magnets 407, 507. The additional heaters and/or magnetic fields can interact with the individual molecules and ions of the gases passing through catalytic converters and increase the efficiency of catalytic conversion that takes place before exiting a catalytic converter.

Figure 15:
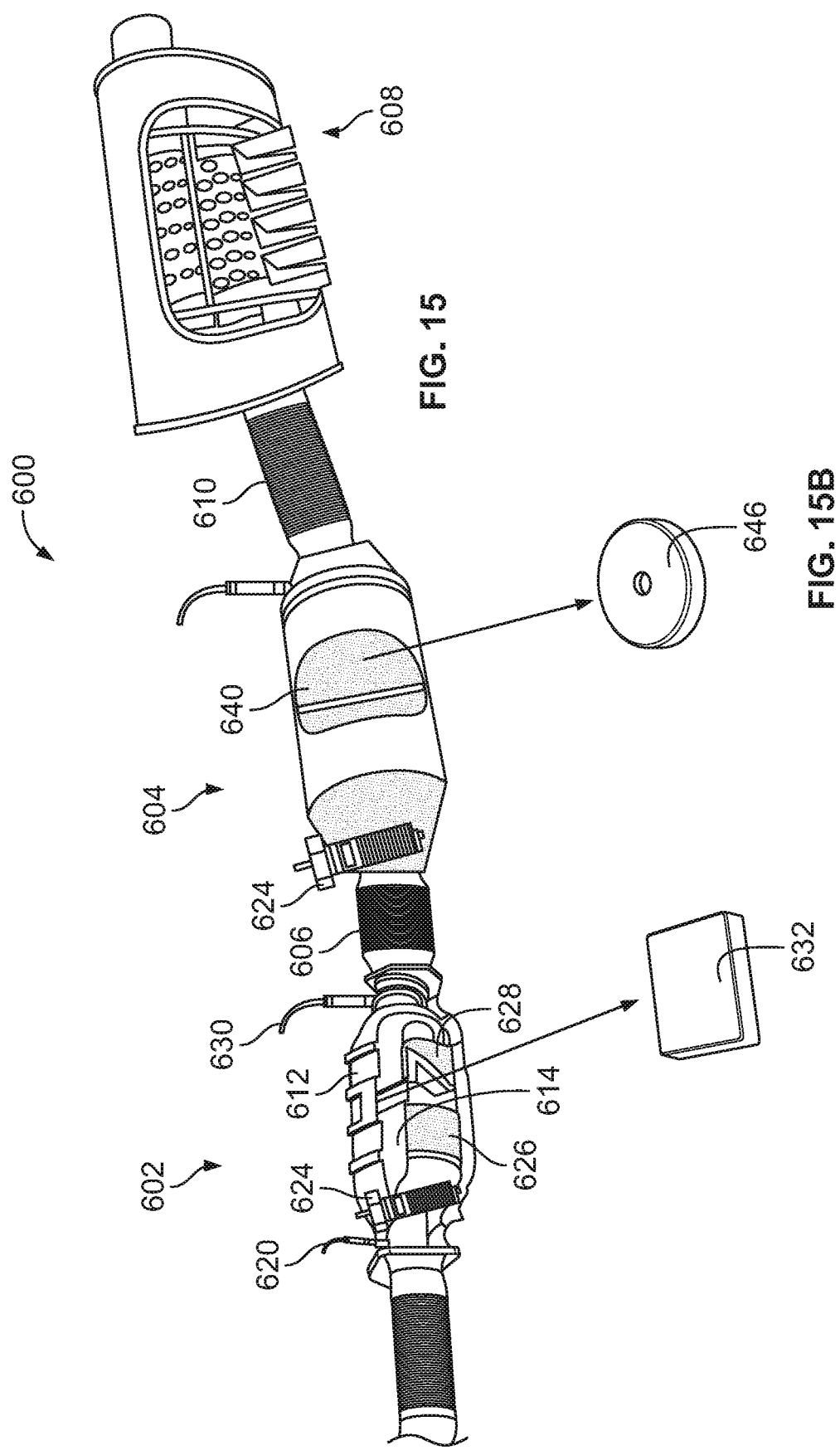
FIG. 15 is a perspective assembly view of an exhaust system or an internal combustion engine that runs on gasoline.

It is noted that in addition to heaters being included within a catalytic converter, they can be added to existing catalytic converters FIG. 15 illustrates an assembly view of an embodiment of an exhaust system 600 for an internal combustion engine that runs on gasoline. The exhaust system 600 generally includes a catalytic converter 602, which is configured to reduce exhaust emissions and is arranged downstream of an engine, a selective catalytic reduction (SCR) filtration system 604 that is arranged downstream of the catalytic converter 602 and connected to the catalytic converter 602 by tubing 606, a muffler 608 that is arranged downstream of the selective catalytic reduction filtration system 604 and connected to the selective catalytic reduction filtration system 604 buy tubing 610.

Figure 16:
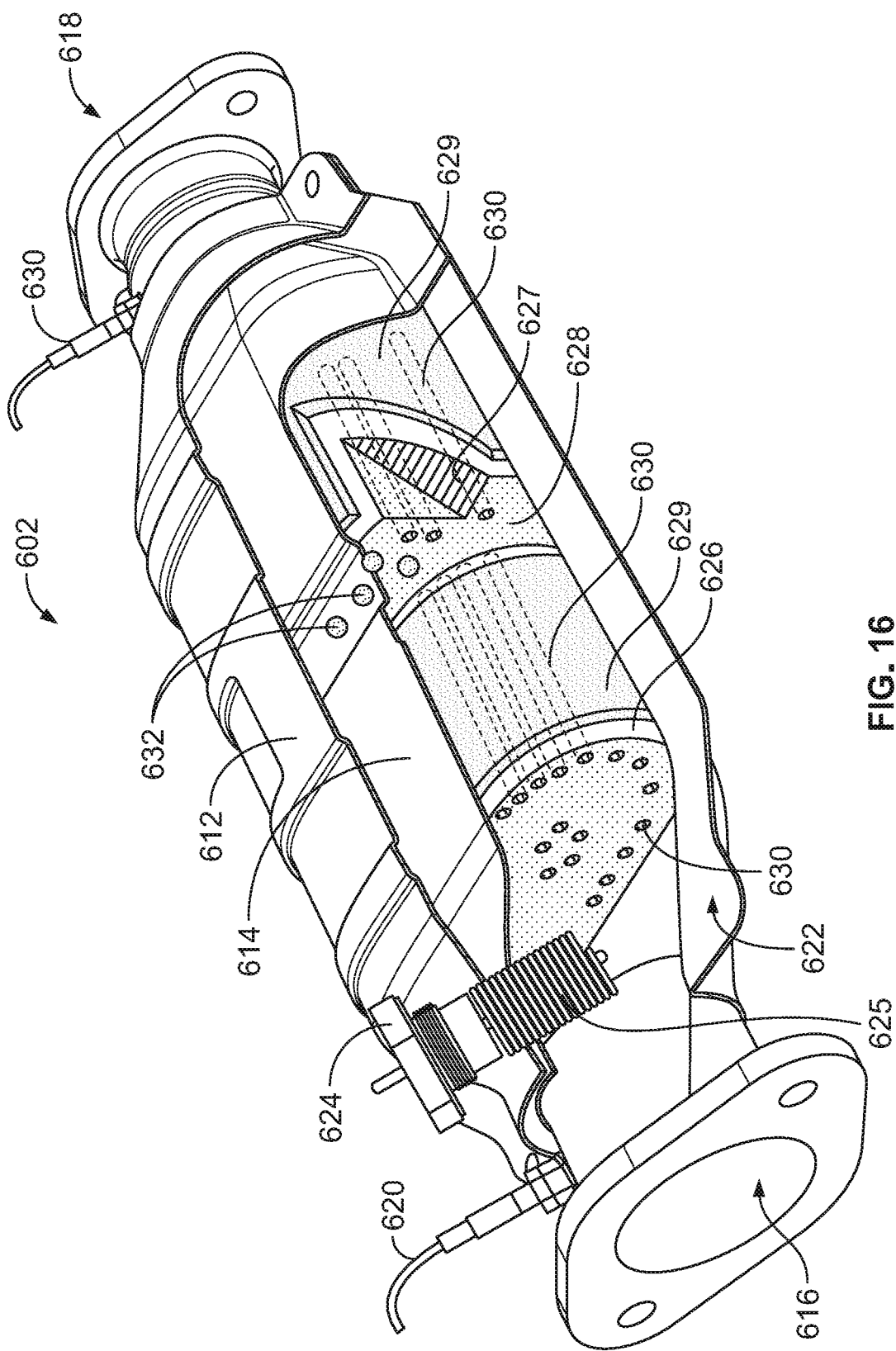
FIG. 16 is a perspective cutaway view of the catalytic converter of the exhaust system of FIG. 15.

As depicted in FIGS. 15 and 16, the catalytic converter 602 includes a first housing or first shell 612, a second housing or second shell 614 that is encompassed by the first housing 612, an inlet 616 where exhaust gases enter the first housing 612 and an outlet 618 where the exhaust where gases exit the first housing 612. Within the internal cavity of the first housing 612, between the inlet 616 and the outlet 618, two filters, including a first filter 626 and a second filter 628, are arranged with the filters 626, 628 being spaced from each other. The first filter 626 is configured to oxidize harmful exhaust gases and in particular carbon dioxide ($CO_2$). The second filter 628 is configured to continue to filter out/eliminate harmful exhaust gases including, but not limited to, carbon dioxide ($CO_2$), carbon monoxide (CO) and nitrogen oxide (NOx) as well as hydrocarbons (HC), and other harmful chemicals. The filters can be comprised of ceramic.

Both the first filter 626 and the second filter 628, which can be comprised, for example, of ceramic, include a plurality of honeycomb shaped openings that are coated 629 with one or more noble metals and include a plurality of rods 630 that extend through the honeycomb structure. The rods 630, which can be comprised of a heat-treated metal or alloy (e.g., copper or steel), extend longitudinally about the filters 626, 628 such that one end of each rod 630 is orientated generally toward the inlet 616 and the other end of each rod 630 is orientated generally toward the outlet 618 of the catalytic converter 602. However, the rods 630 can also or instead be arranged traverse about the filters 626, 628. As addressed further below, the rods 630 function to transfer heat into the filters 6262, 628 and the heated rod mass within the filters 626, 628 helps to maintain a constant temperature within the catalytic converter 602. Additionally, between the first housing 612 and the second housing 614, as shown in FIG. 15A, a plurality of magnets 632 are arranged and disbursed. While the placement of the magnets 632 is shown between the housings 612, 614, the magnets 632 can be placed on or within both filters 626, 628, within the cavity 622 and/or external of the first housing 612.

To assess the percentage of oxygen in the exhaust gas, an oxygen sensor 620, which communicates with an electronic control unit, is fixed external to the catalytic converter 602 and extends into a cavity 622 of the first housing 612, downstream of the inlet 616 and before the first filter 626. To increase the internal temperature of the catalytic converter 602 above a threshold temperature, an electric heater 624 is utilized that extends into the first housing cavity 622 from outside of the second housing 614, upstream of the first filter 626. The heater 624 is connected external of the catalytic converter to a power source and electronic control unit and operates to heat the interior of the catalytic converter 602 above a threshold temperature. The heater 624 depicted in FIG. 16 includes a wound metal coil 625. However, the heater 624 can take any form to ensure internal hearting of the catalytic converter 602. It is noted that while the heater 624 is shown to extend into the catalytic converter 602 in in FIGS. 15 and 16 before the filters 626, 628, more than one heater 624 can be arranged to extend into the cavity 622, the heater(s) 624 can be arranged within one or more of the filters 626, 628, a heater 624 can be arranged between the filters 626, 628, etc. As such, the placement of the heater(s) 624 should not be limited to the embodiment shown in the figures. It is further noted that one or more heaters of any design can be arranged entirely within the cavity 622 of the catalytic converter 602 at any position within the catalytic converter 602 within the first housing 612 and/or the second housing 614 and/or can be fixed external to the catalytic converter 602 and/or fixed within or external to the tubing 606 that is located directly upstream of the catalytic converter 602. To assess the temperature of the exhaust gas prior to exiting the catalytic converter 602, a heat sensor 630, which is connected to an electronic control unit (ECU), is located near the inlet 616 and/or outlet 618.

Upon startup of an engine from a cold start, the electric heater 624 is simultaneously turned on by the electronic control unit to aid in heating the internal temperature of the catalytic converter 602 (i.e., the catalytic converter is heated for a minimum of seven minutes upon engine startup) above the temperature of the exhaust gases and particulate matter. The heater 624 can remain on after reaching a desired temperature or it can be turned off and then turned back on if the temperature within the catalytic converter 602 drops below a threshold temperature. This is done via the electronic control unit which can receive input signals from one or more thermometers and other sensors and generates a signal to control the activity of the heater 624. The rods 630, which extend longitudinally about the filters 626, 628 in an assembled state within the catalytic converter 602 provide a conduit for more rapid heat transfer from the heater 624 through the filters 626, 628 and thereby accelerate heating the internal temperature of the catalytic converter 602 to a desired internal temperature and aid in maintaining the desired internal temperature above a threshold across the surface area of the filters 626, 628 and cavity 622 of the catalytic converter 602 to oxidize harmful exhaust gases at least throughout the filters 626, 628 and surrounding internal surface area.

By increasing the internal temperature of the catalytic converter 602 to a temperature greater than the normal operating temperature of the catalytic converter 602, harmful chemicals and particulates that are part of the exhaust gas are oxidized and/or burned off before exiting the catalytic converter 602 more efficiently than in than in a conventional catalytic converter. The filters 626, 628 aid to trap and/or slows the flow of the exhaust gases as they passes across the internal cavity of the catalytic converter 602 through the honeycomb openings and the noble metal filter coating 629 aids to further slow and disrupts the flow of the exhaust gases across the internal catalytic converter cavity 622 such that more of the harmful exhaust emissions can be heated above a threshold exhaust gas temperature and oxidize and/or burn off prior to exiting the catalytic converter 602. The threshold temperature can be optimized for any given configuration based on the amount of additional oxidization/burn off desired balanced with the physical limitations of the system 602 components and other factors.

The magnets 632 polarity aids to further disrupt and slow the flow of exhaust gases and particulates as they pass through the catalytic converter 602 by increasing the electric current within the cavity 622 of the catalytic converter 602. Disrupting and slowing the flow of exhaust gases and particulates allows for heating of the exhaust gases for a longer period of time within the cavity 622 of the catalytic converter 602 and in turn further oxidization and reduction of toxic byproducts of exhaust gases. Because the temperature within the catalytic converter 602 can be very high, the magnets 632 used should be capable of operating at the expected maximum temperature without suffering degradation (e.g., AlNiCo magnets).

Downstream of the catalytic converter 602 and connected to the catalytic converter 603 by tubing 606 is the selective catalytic reduction system 604, which is configured to reduce nitrogen dioxide ($NO_x$) gases by oxidizing the nitrogen dioxide gases and converting them into harmless exhaust emissions (e.g., nitrogen, water, and a small amount of carbon dioxide) that are emitted out of the exhaust system 600 and into the environment without the need to incorporate a liquid-reductant agent into the exhaust stream to reduce the amount of nitrogen dioxide.

Figure 17:
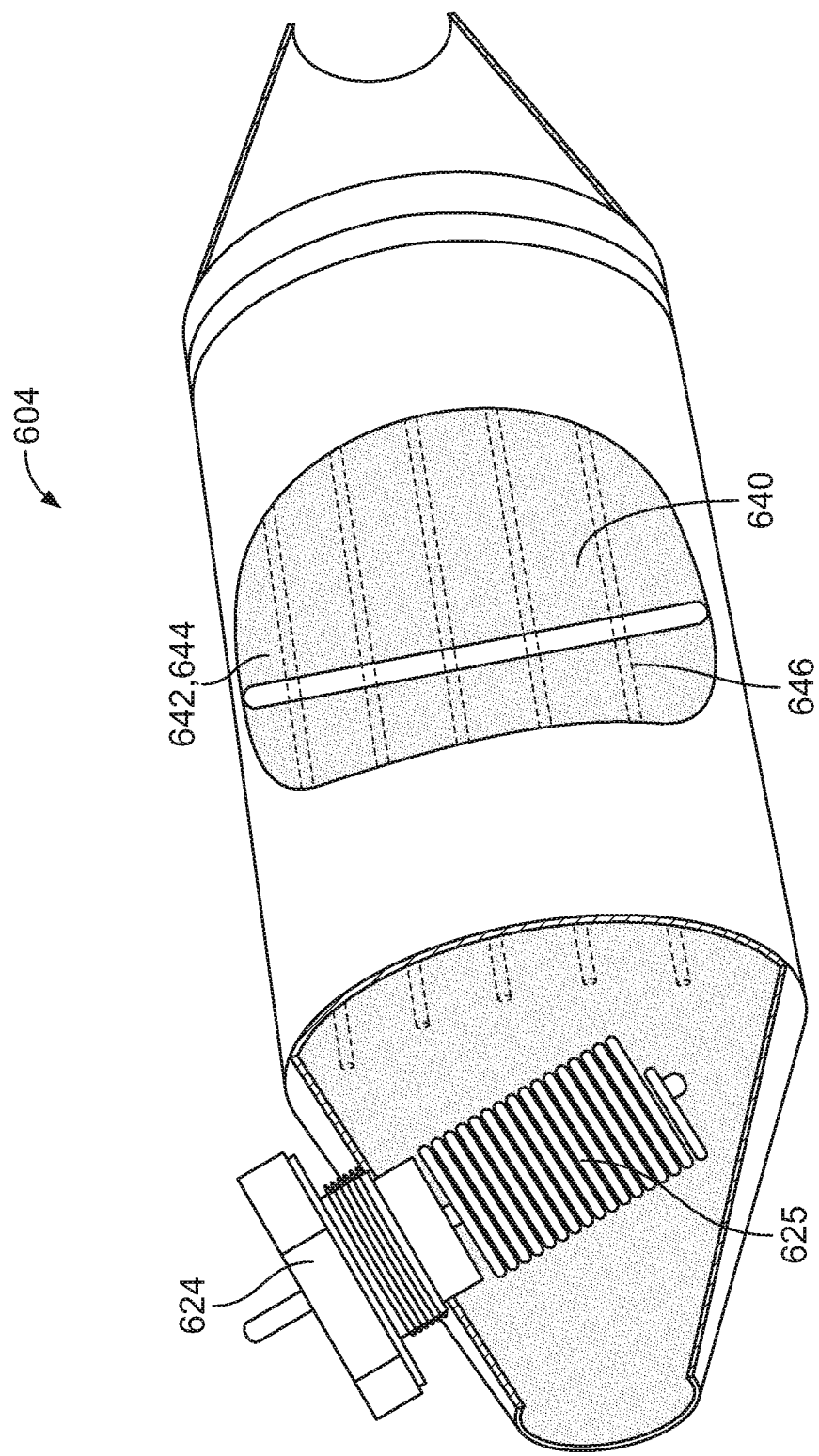
FIG. 17 is a perspective cutaway view of a selective catalytic reduction system of the exhaust system of FIG. 16.

The selective catalytic reduction system 604 as depicted in FIG. 17 is comprised of a filter 640 that includes a plurality of honeycomb shaped openings in addition to small holes 642 that are dispersed about the filter 640. The small holes 642 are included to further disrupt the flow of exhaust gases from a laminar path and slow down the gases from exiting the selective catalytic reduction system 604 (see also FIG. 18A). The filter 640, similar to the filters 626, 628 in the catalytic converter 602, is coated with one or more noble metals 644 and includes a plurality of heat transfer and stabilization rods 646 that extend longitudinally through the honeycomb structure such that the one end of each rod 646 is orientated generally toward the inlet 616 and the other end of each rod 646 is orientated generally toward the outlet 618. The rods 646 can be comprised of a heat-treated metal or alloy (e.g., copper or steel). A second electric heater 624, which communicates with an electronic control unit, extends into the selective catalytic reduction system 604 upstream of filter 640. Similar to the filters 626, 628 of the catalytic converter 602, the rods 646 and metal coating 644 of the filter 640 of the selective catalytic reduction system 604 aid to ensure the internal temperature across the filter 640 is maintained. It is noted that the selective catalytic reduction system 604 includes one or more nitrogen dioxide sensors that are maintained by the electronic control unit and used to control the electric heater 624 to ensures that the system 640 operates efficiently.

Figures 18A, 18B:
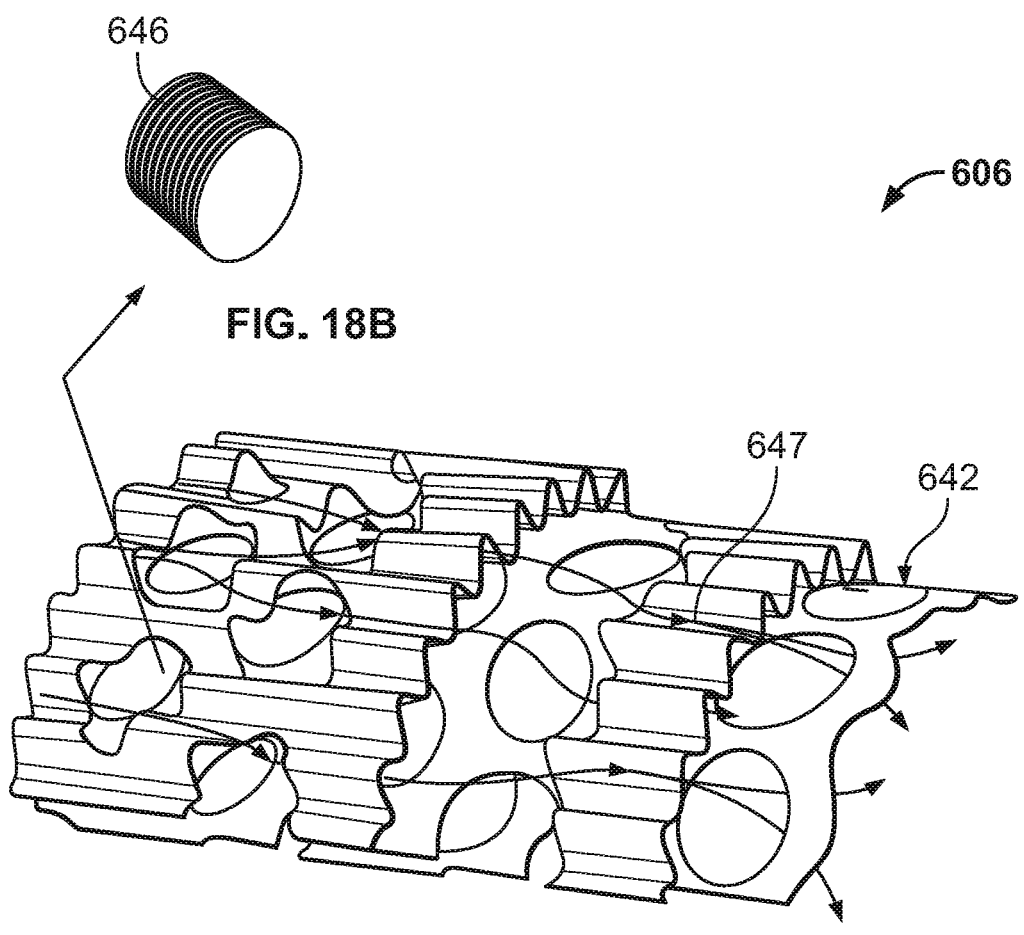
FIG. 18A is a sectional view of the filter of the selective catalytic reduction system of FIG. 17.
FIG. 18B is a perspective view of one of the magnets arranged in the filter of the selective catalytic reduction system.

By increasing the internal temperature of the selective catalytic reduction system 604, more of the harmful chemicals and particulates that are part of the exhaust gas are burned off The filter 640 aids to trap and/or slows the flow of the exhaust gases as they passes across the internal cavity of the selective catalytic reduction system 604 through the honeycomb openings and the noble metal filter coating 644 aids to further slow and disrupts the flow of the exhaust gases such that more of the harmful exhaust emissions can be heated above a threshold temperature (that exceeds a normal operating temperature within the catalytic converter 602 absent the heater 624) and burn off prior to exiting the selective catalytic reduction system 604. In addition to the rods 646 and coating 644, a plurality of magnets 646 are arranged and disbursed within the filter 640 as shown in FIGS. 15B, 18A and 18B.

Similar to the magnets 632 in the catalytic converter 602, the polarity of the magnets 646 aids to further disrupt and slow the flow 647 of exhaust gases and particulates as they pass over the filter 640 by increasing the electric current in the vicinity of the magnets 646 to disrupt and slow the flow of exhaust gases and particulates which in turn allows for heating of the exhaust gases for a longer period of time within the selective reduction system 604 and in turn further oxidization and reduction of toxic byproducts of exhaust gases. It is noted that in addition or instead of the placement of the magnets 646 within the filter, the magnets 646 can be arranged between the filter 640 and the selective catalytic reduction system 604, and/or external the selective catalytic reduction system 604 housing. Because the temperature within the selective catalytic reduction system 604 can be very high, the magnets 646 used should be capable of operating at the expected maximum temperature without suffering degradation (e.g., AlNiCo magnets).

Figure 19:
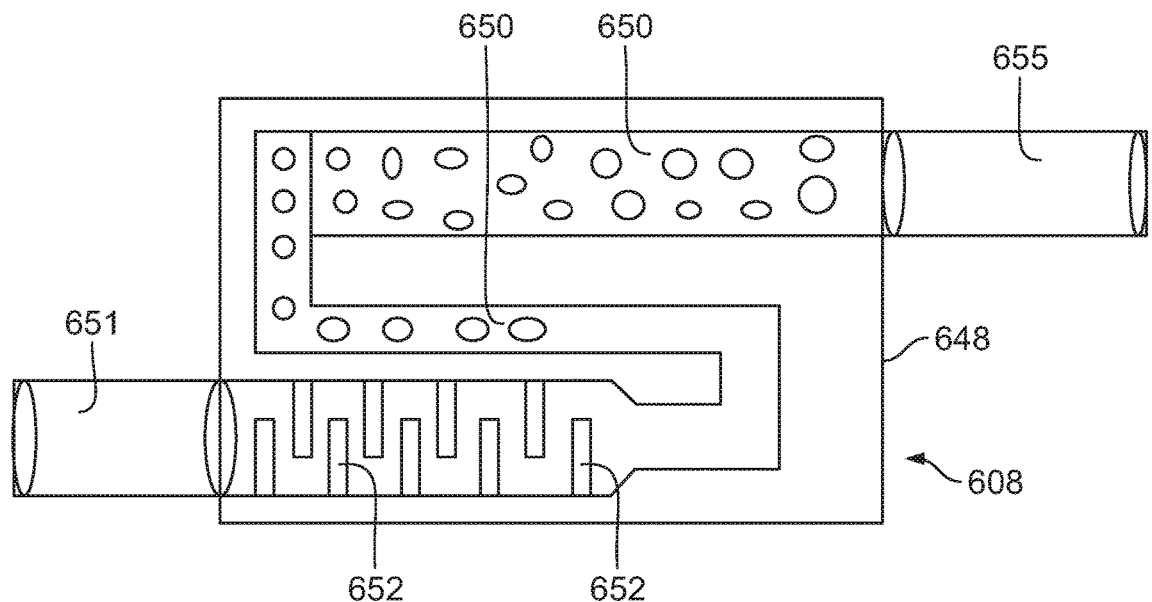
FIG. 19 is a top view of a muffler associated with the exhaust system of FIG. 15.
Figure 20:
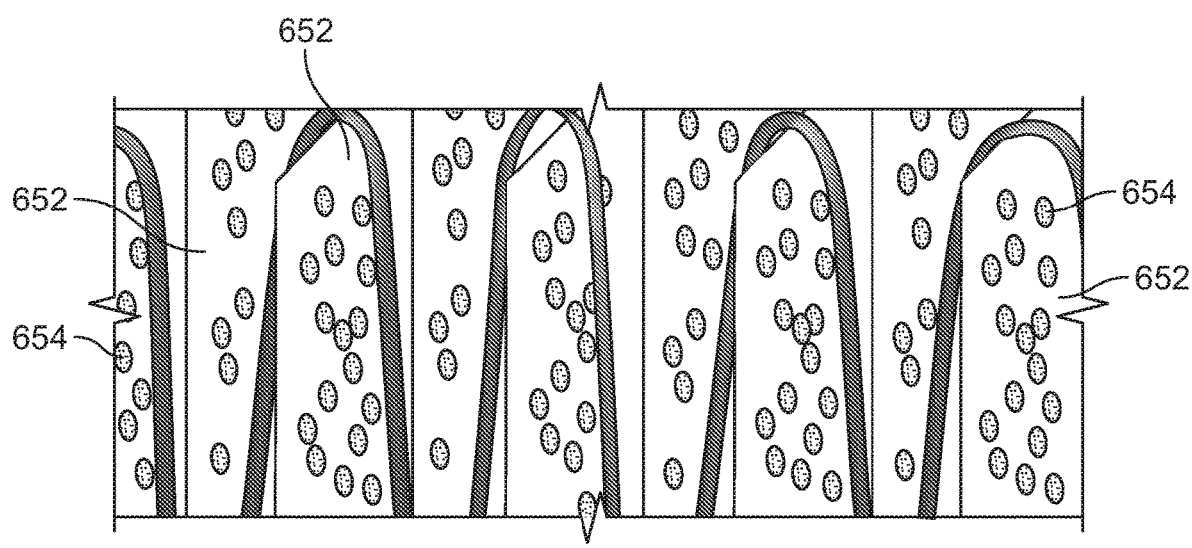
FIG. 20 is a detail view of coated plates arranged within the muffler of FIG. 19.

Upon exiting the selective catalytic reduction system 604, the remaining exhaust gases will flow through the tubing 610 that connects the selective catalytic reduction system 606 and into the muffler 608. The muffler 608 is configured to reduce or "muffle" engine noise, further reduce remaining harmful exhaust gases and cool the exhaust temperature. As depicted in FIGS. 19 and 20, the muffler 608 includes a housing 648 in which one or more silencers 650 and a plurality of plates 652 that are interdispersed and/or spaced from each other are located. The plates 652, which can, for example, be comprised of steel, are coated with one or more noble metal(s) 654 and are located near an inlet 652 of the muffler 608. The noble metal coating 654 aids, similar to in the catalytic converter 602, to cause the flow of the exhaust gases to become turbulent within the housing 648 and disrupt and in turn slows the flow of hot exhaust gases as they pass from the inlet 652 of the muffler 608 through the muffler housing 648 and exit the exhaust housing 648 though an outlet 654. The disruption of the exhaust gases within the muffler 608 due to the inclusion of the noble metal coated plates 652 allows for more time for the exhaust gases to burn off harmful emissions prior to exiting the muffler 608 and entering the environment.

FIGS. 21A-26 illustrate an embodiment of an exhaust system 700 for a vehicle that runs on diesel fuel. The exhaust system 700 generally includes a catalytic converter 702, a diesel particulate filter (DPF) 704, tubing 706 that connects the catalytic converter 702 to the diesel particulate filter 704, a selective catalytic reduction (SCR) filtration system 708, tubing 710 that connects the catalytic converter 702 to the selective catalytic reduction filtration system 708, a muffler 712 and tubing 714 that connects the muffler 712 to the selective catalytic reduction filtration system 708.

Figure 22:
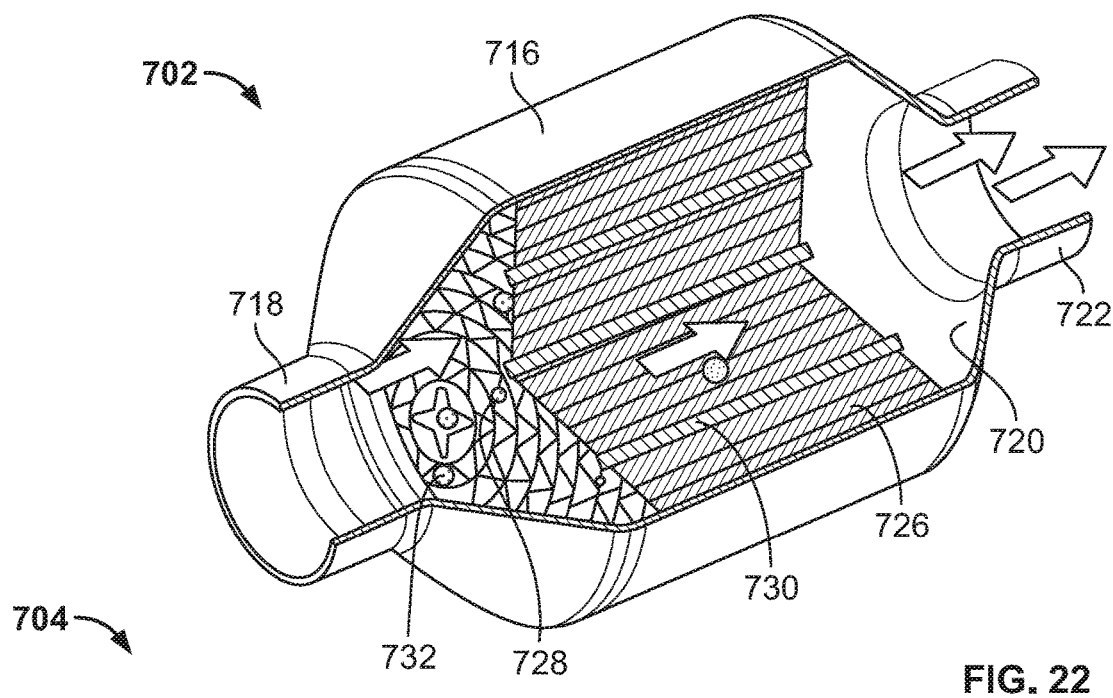
FIG. 22 is a perspective cutaway view of the catalytic converter of the exhaust system of FIG. 21A.
Figure 23:
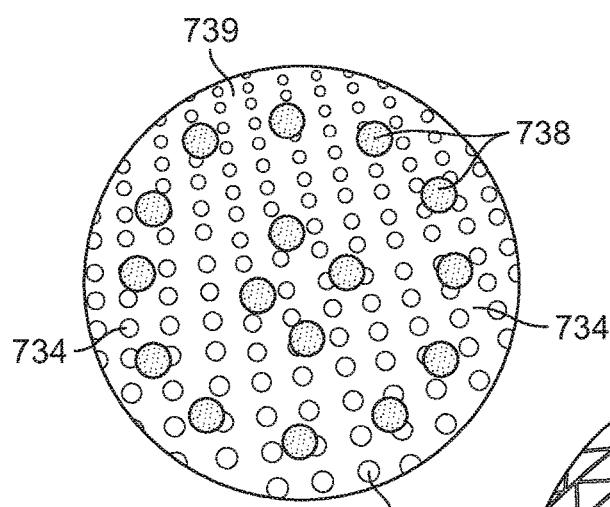
FIG. 23 is an end view of a filter arranged in the selective catalytic reduction system of the exhaust system of FIG. 21A.
Figure 24:
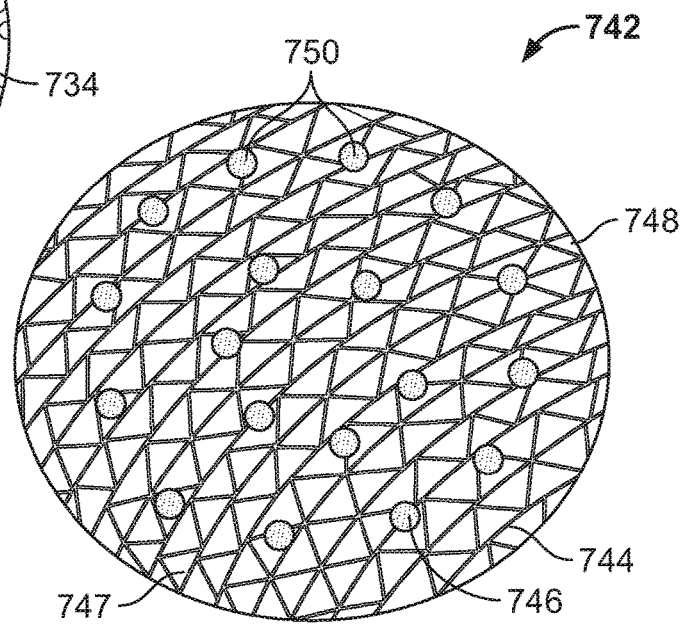
FIG. 24 is an end view of a filter arranged in the diesel particulate filter of the exhaust system of FIG. 21A.

As depicted in FIG. 22, the catalytic converter 702 includes a housing 716, an inlet 718 where exhaust gases enter a cavity 720 of the housing 716 and an outlet 722 where the exhaust where gases exit the housing 716. An oxygen sensor is fixed externally to the housing 716 and extends into the cavity 720, downstream of the inlet 718 to assess the percentage of oxygen in the exhaust gas. An electric heater 724 (see FIG. 21A) extends into the cavity 720 from outside of the housing 716. The heater 724 is connected external of the catalytic converter 702 to a power source and an electronic control unit. The heater 724 depicted in FIG. 21A includes a wound metal coil 725. However, the heater 724 can take any form to ensure internal hearting of the catalytic converter 702. To assess the temperature of the exhaust gas prior to exiting the catalytic converter 702, a heat sensor is located near the inlet 718 and/or outlet 722.

As shown in FIG. 22, within the internal cavity 722 of the housing 716, downstream of the heater 724, at least one filter 726 is arranged. The filter 726 is configured to filter out/eliminate harmful exhaust gases including, but not limited to, carbon dioxide ($CO_2$), carbon monoxide (CO), nitrogen oxide (NOx) as well as hydrocarbons (HC), particulate matter (PM) and other harmful chemicals and debris. The filter 726, which can be comprised, for example, of ceramic, is coated with one or more noble metals 728 and includes a plurality of honeycomb shaped openings. The openings of the filter 726 are configured to disrupt the flow of exhaust gases and trap particulate matter to prevent the particulate matter from being emitted into the environment. A plurality of rods 730, which can be comprised of a heat-treated metal or alloy (e.g., copper or steel) extend longitudinally through the honeycomb structure of the filter 726. The rods 730 can also or instead extend traverse about the filter 726. Additionally, a plurality of magnets 732 are disbursed internal of the housing 716. The magnets 732 can be arranged near or in contact with the filter 726 and/or within the filter 726.

Similar to an engine that utilizes gasoline, upon startup of a diesel engine that utilizes the exhaust system 700 from a cold start, the electric heater 724 is simultaneously turned on by an electronic control unit (ECU) to aid in heating the internal temperature of the catalytic converter 702 (i.e., the catalytic converter is heated for a minimum of seven minutes upon engine startup) above a temperature of the exhaust gases and particulate matter. The heater 724 can remain on after reaching a desired temperature or it can be turned off and then turned back on if the temperature within the catalytic converter 702 drops below a threshold temperature. The rods 730 are configured to accelerate heating the internal temperature of the catalytic converter 702 to a desired internal temperature and aid in maintaining the desired internal temperature at least throughout the filter 726 and surrounding internal surface area.

By increasing the internal temperature of the catalytic converter 702, harmful chemicals and particulates that are part of the exhaust gas are oxidized and/or burned off before exiting the catalytic converter 702. The noble metal filter coating 728 aids to further slow and disrupts the flow of the exhaust gases across the internal catalytic converter cavity such that more of the harmful exhaust emissions can be heated above a threshold temperature and burn off prior to exiting the catalytic converter 702. The magnets 732 further disrupt and slow the flow of exhaust gases and particulates as they pass through the catalytic converter 702, similar to the magnets 632, 634, 646 incorporated into the gasoline exhaust system 600, by increasing the electric current within the cavity 720 of the catalytic converter 702 via the polarity of the magnets 732. Disrupting and slowing the flow of exhaust gases and particulates allows for heating of the exhaust gases for a longer period of time within the cavity 720 of the catalytic converter 702 and in turn further oxidization and reduction of toxic byproducts of exhaust gases.

Figure 21A:
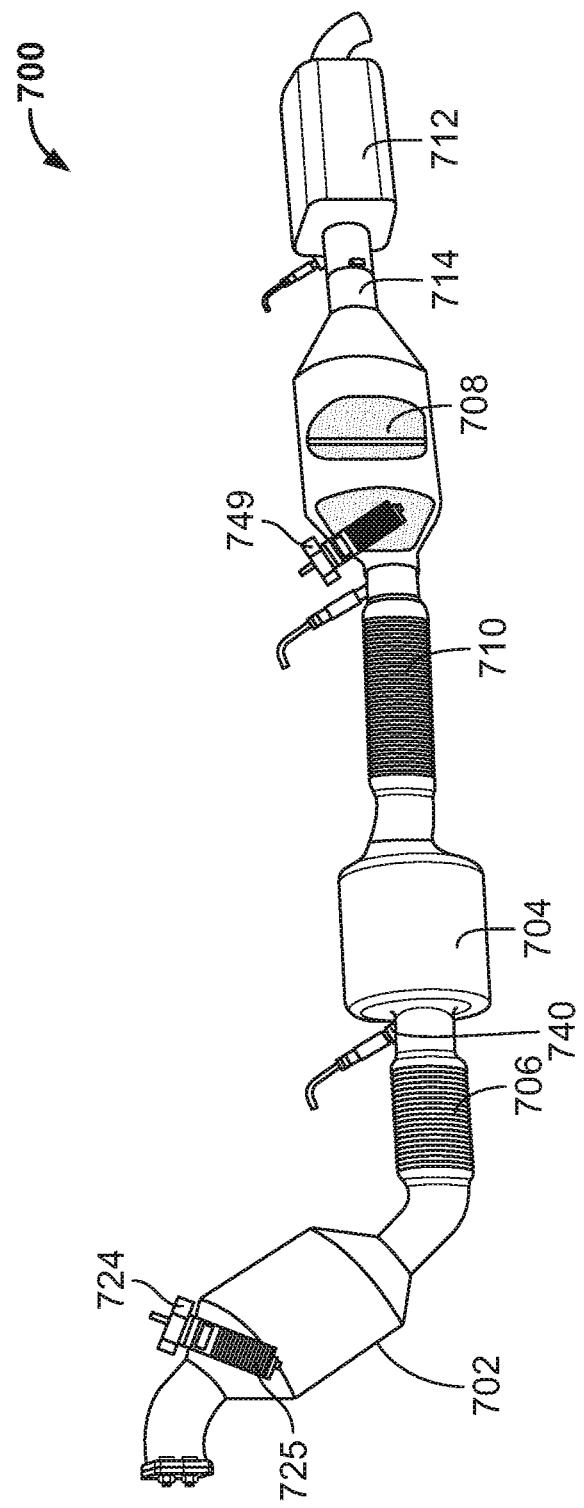
FIGS. 21A and 21B are a perspective assembly views of an exhaust system or an internal combustion engine that runs on diesel.
Figure 21B:
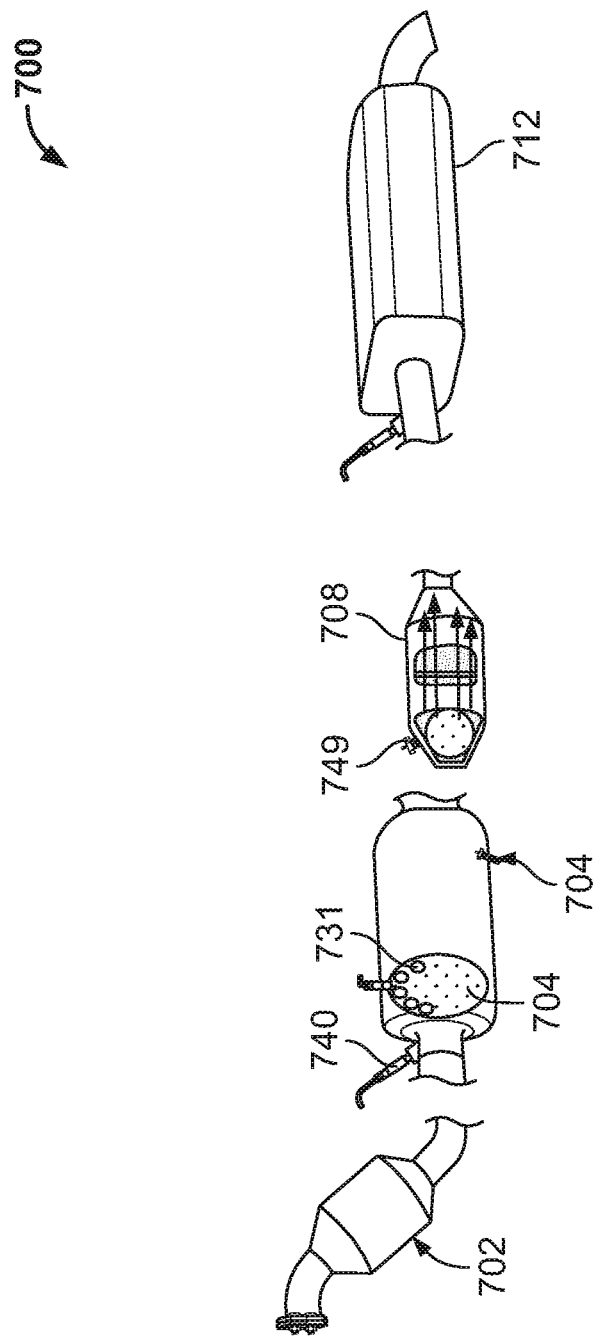

Upon exiting the catalytic converter 702, the remaining harmful exhaust gases, particulates and debris travel through the tubing 710 and into the diesel particulate filter 704. The diesel particulate filter 704 is designed to trap particulates (e.g. soot) after they exit the catalytic converter 702 and prior to exiting the exhaust system 700 and being emitted into the environment. As depicted in FIG. 21B, the diesel particulate filter 704 is a ceramic filter that includes a plurality of honeycomb shaped openings that are configured to trap particulates (e.g., soot) to prevent the particulates from being emitted into the environment. The filter 704 is coated with one or more noble metals 736 and includes a plurality of rods 738 that extend through the honeycomb structure and can be comprised of a heat-treated metal or alloy (e.g., copper or steel). Additionally, a plurality of magnets 739 are disbursed at least one of internal of the filter 704, near or in contact with the filter 704 and/or within the filter 704.

In order to reduce the particulate matter that has accumulated on the filter 704 and prevent the particulate matter from blocking the filter 704 and in turn creating backpressure in the exhaust system 700, the filter 704 must be cleaned through regeneration by burning off the particulate that has accumulated on the filter 704. Typically, there are two types of regeneration, including active regeneration and passive regeneration where the oxidation temperature of the particulate matter is lowered allow for auto-regeneration during regular operation of the vehicle commonly by adding a catalyst precursor to the fuel or to the filter. Here, the diesel particulate filter 704 uses active regeneration. However, unlike existing regeneration systems, a heater 740, which communicates with an electronic control unit, is placed upstream of the filter 704 and used in combination with the rods 738, metal coating 736 and magnets 739 arranged within the filter 704 to increase the electrical current (magnets), disrupt the flow of exhaust gases and particulate matter (coating) and raise the temperature of the filter 704 (rods) and in turn raise the temperature of the particulates that are trapped on and within the filter to oxidize the particulate and create a gaseous byproduct (i.e., $CO_2$). Additionally, the percentage of nitrogen dioxide in the exhaust gas is reduced and converted to nitrogen monoxide. This chemical process is constantly repeated to so that the filter 704 to continuously cleaned and requires no maintenance. As such there is not a need for any further aid with regeneration, for example, with the assistance from an engine management system.

Downstream of the diesel particulate filter 704 in the diesel exhaust system 700 is the selective catalytic reduction system 708, which, similar to the selective catalytic reduction system 604 in the gasoline exhaust system 600, is configured to reduce nitrogen dioxide gases by oxidizing them and converting them into harmless exhaust emissions (e.g., nitrogen, water, and a small amount of carbon dioxide) that are emitted out of the exhaust system 700 and into the environment without the need to introduce a liquid-reductant agent that into the exhaust stream.

The selective catalytic reduction system 708 is comprised of a filter 742 that includes a plurality of honeycomb shaped openings 744 and small holes 746 dispersed about the filter 742. The filter 742 is coated with one or more noble metals 748, includes a plurality of rods 750 that extend through the honeycomb structure and a plurality of magnets 747 that are dispersed about the filter 742.

An electric heater 749, which communicates with an electronic control unit, extends into the selective catalytic reduction system 708, upstream of filter 742. The heater 749 is configured to raise the internal temperature of the selective catalytic reduction system 708 above a threshold in conjunction with the rods 750 and metal coating 748 to ensure that the internal temperature across the filter 742 and surrounding internal surface area is greater than the temperature of the remaining exhaust gases and particulate matter and is maintained to further reduce the percentage of nitrogen dioxide gases as they travel across the filter 742. The small holes 746 and magnets 747 are included to aid in further disrupting the flow of exhaust gases as they travel within the selective catalytic reduction system 708 to provide more time for the exhaust gases to oxidize and/or be burned off as they pass through the heated system 708 before exiting. It is noted that the selective catalytic reduction system 706 includes one or more nitrogen dioxide sensors to ensures that the system 706 operates efficiently.

Figure 25:
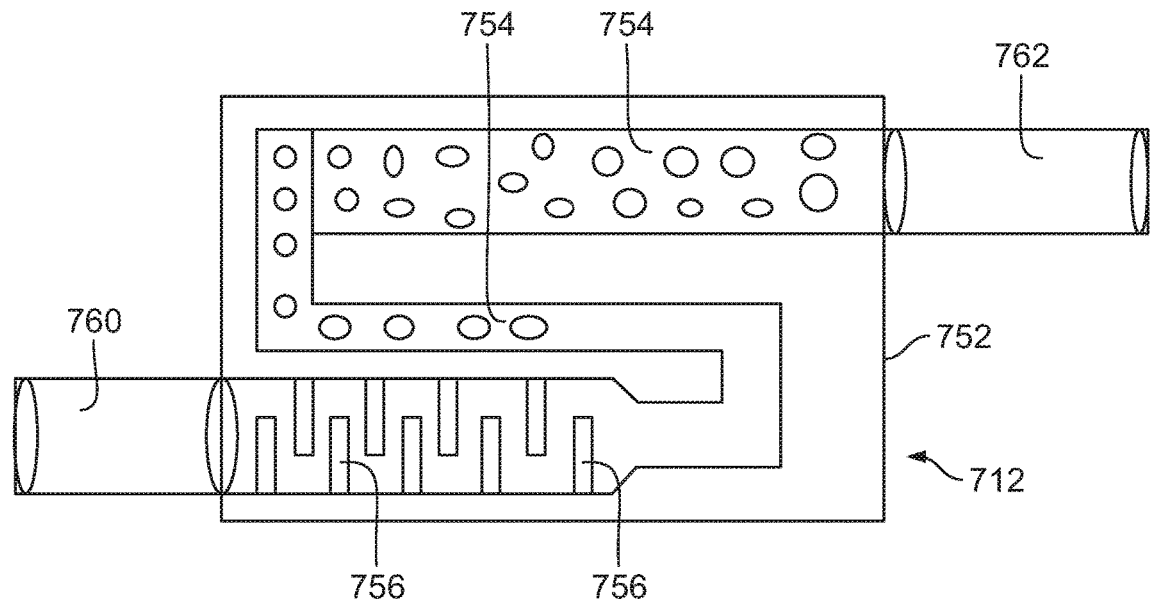
FIG. 25 is a top view of a muffler associated with the exhaust system of FIG. 21A.
Figure 26:
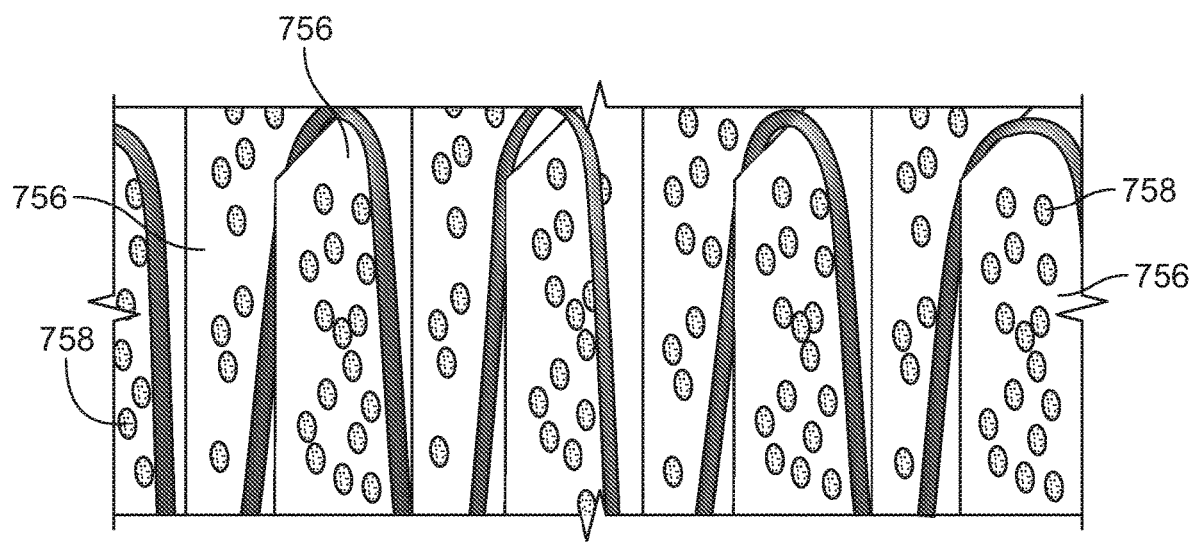
FIG. 26 is a detail view of coated plates arranged within the muffler of FIG. 25.

Upon exiting the selective catalytic reduction system 706, the remaining exhaust gases will flow through the tubing 714 to the muffler 712. The muffler 712 is identical to the muffler 608 for the gasoline exhaust system. As depicted in FIGS. 25 and 26, the muffler 712 includes a housing 752 in which one or more silencers 754 and a plurality of plates 756 that are interdispersed and/or spaced from each other are located. The plates 756, which can, for example, be comprised of steel, are coated with one or more noble metal(s) 758. The noble metal coating 758 aids to disrupt the flow of the exhaust gases within the housing 752 such that they become turbulent, which in turn slows the flow of the hot exhaust gases as they pass from an inlet 760 of the muffler 712 through and exit the muffler housing 752 though an outlet 762. The disruption of the exhaust gases within the muffler 712 due to the inclusion of the noble metal coated plates 756 allows the exhaust gases and particulate matter more time within the muffler 712 to burn off and/or oxidize prior to exiting the muffler 712 and entering the environment.

Figures 27, 27A, 27B:
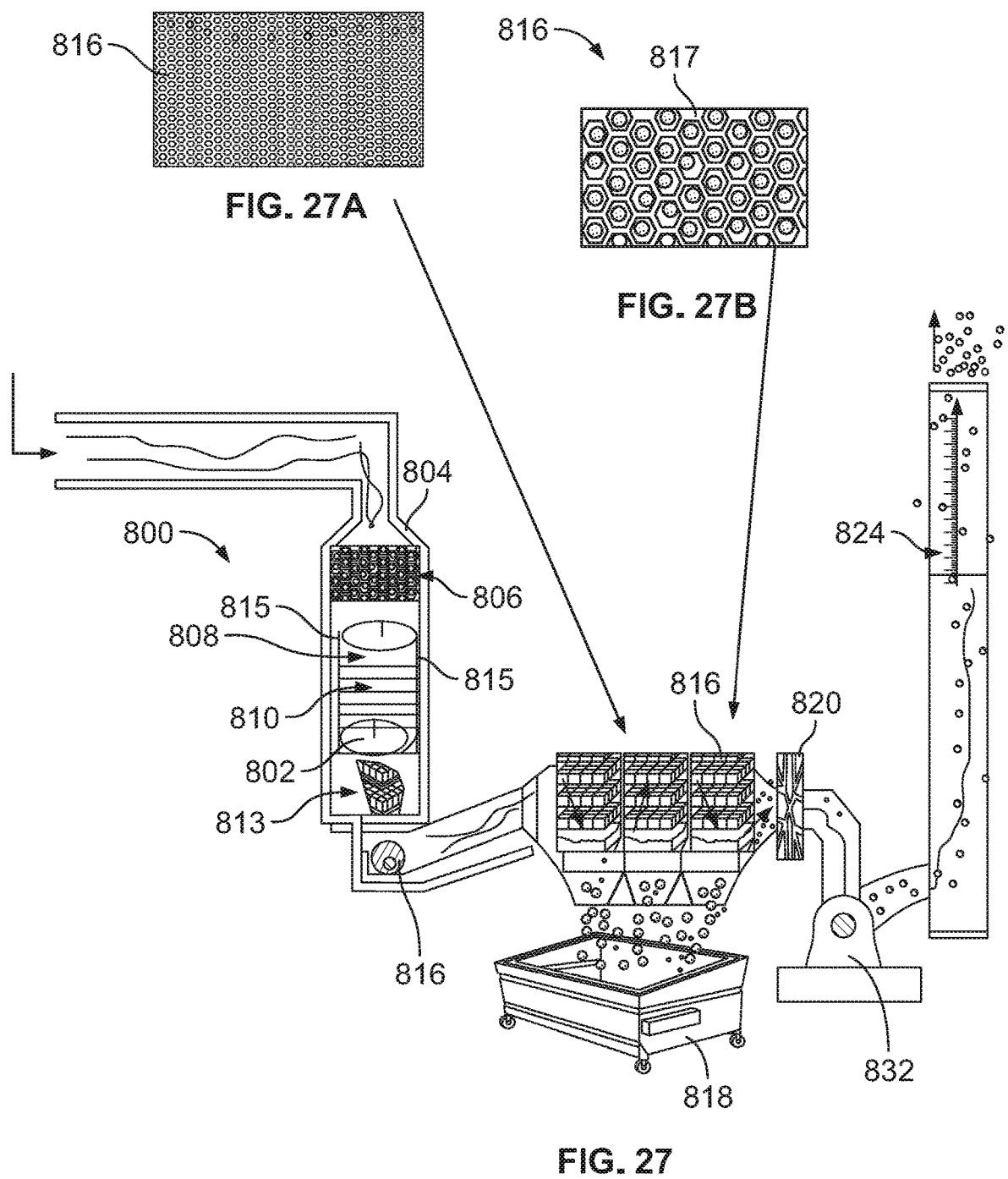
FIG. 27 is an assembly view of an exhaust system for a coal related application.
FIGS. 27A and 27B are front views of a filter arranged in the catalytic converter of the exhaust system of FIG. 27.

FIG. 27 illustrates an exhaust system 800 for a coal burning apparatus, device or the like. The exhaust system 800 includes a housing 802. Sequentially, within the housing 802 is a first selective catalytic reduction filtration system 806 directly downstream of an inlet 804, a first electric heater 808, a second selective catalytic reduction filtration system 810, a second heater 812 and another filter 813 with a honeycomb structure. Additionally, dispersed about the interior of the housing 802, near the internal sidewall is a plurality of magnets 815. It is noted that the design and properties of the selective catalytic reduction filtration systems 806, 810 and heaters 808, 812 are the same as those discussed above with regard to the gasoline and diesel exhaust systems 600, 700 and as such the same features are incorporated by references as part of the coal exhaust system 800.

Downstream of the exhaust system 800 in FIG. 27 is a first electric blower 814, a plurality of filters 816 that include a honeycomb structure 817 (see details in FIGS. 27A and 27B), chutes 817 that direct unburned particles (e.g., coal) to a waste bin 818 in which the unburned particles are disposed, an additional metal filtration system 820, a second electric blower 822 and a smoke stack 824 through which clean gases exit into the environment.

Figure 28:
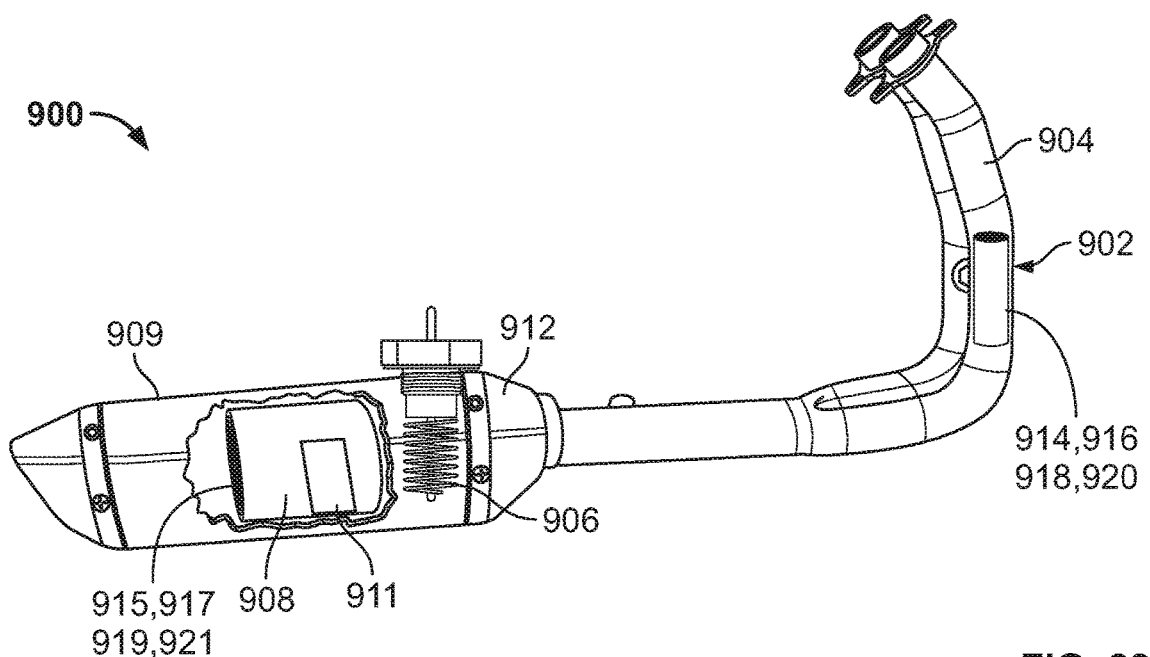
FIG. 28 is an exhaust system for a motor cycle.

FIG. 28 depicts an exhaust system 900 for a motorcycle. As shown, a first selective catalytic reduction filtration system 902 is arranged within exhaust tubing 904 and an electric heater 906 and a second selective catalytic reduction filtration system 908 are arranged within an exhaust housing 909. As shown in FIG. 28, the heater 906 is arranged to extend within housing 909 near an inlet 912 of the housing 908 with the second selective catalytic reduction filtration system 908 located downstream of the heater 906. The heater 908 is configured to operate using the desired voltage (e.g., 6-45 amps) of the vehicle.

The selective catalytic reduction filtration systems 902, 908, like the selective catalytic reduction filtrations systems 604, 708, 806, 810 discussed above, are configured to reduce nitrogen dioxide gases by oxidizing the nitrogen dioxide gases and converting them into harmless exhaust emissions that are emitted out of the exhaust system 900 and into the environment without the need to introduce a liquid-reductant agent into the selective catalytic reduction filtrations systems 902, 908.

The selective catalytic reduction systems 902, 908 each, respectively, include a filter 914, 915 that has a plurality of honeycomb shaped openings coated with one or more onble metals 916, 917, a plurality of rods 918, 919 comprised of a metal or alloy that extend longitudinally through the honeycomb structure and a plurality of magnets 920, 921. It is noted that the rods 918, 919 could instead or in addition extend traverse about the filter 914, 915. The rods 918, 919 and metal coating 916, 917 aid to ensure the internal temperature across the filters 914, 915 are maintained. The magnets 920, 921 are arranged and disbursed within the filters 914, 915 to aid, through their polarity, to further disrupt and slow the flow of exhaust gases and particulates as they pass over the filters 914, 915 by increasing the electric current in the vicinity of the magnets 920, 921 to allow for heating of the exhaust gases for a longer period of time within each respective selective reduction system 902, 908 and in turn further oxidization and reduction of toxic byproducts of exhaust gases. It is noted that in addition or instead of the placement of the magnets 920, 921 within the filter 914, 915, the magnets 920, 921 can be arranged adjacent to the filters 914, 915 and/or external each respective selective catalytic reduction system 902, 908 housing.

It is further noted that while two selective catalytic reduction systems 902, 908 are shown, exhaust system 900 can include only a single selective catalytic reduction system 908 in the housing 909.

Figure 29:
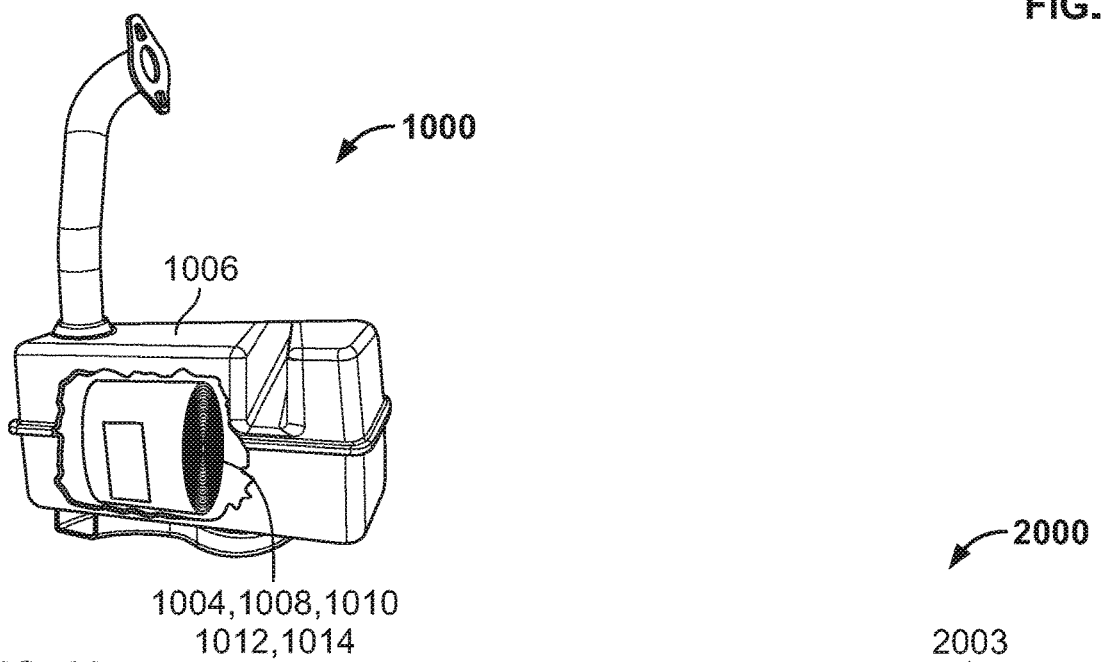
FIG. 29 is a exhaust system for a lawn mower.

FIG. 29 depicts an exhaust system 1000 for a lawnmower. As shown, an electric heater 1002 and a selective catalytic reduction filtration system 1004 are arranged within an exhaust housing 1006. The heater 1002 is arranged to extend within housing 1006 upstream within the housing 1006 with the selective catalytic reduction filtration system 1004 located downstream of the heater 1002. The heater 1002 is configured to operate using the desired voltage (e.g., 6-45 amps) of the vehicle. It is noted that should the lawnmower and/or another machine not operate on a battery that the heat could be supplied by the engine instead of using a heater.

The selective catalytic reduction filtration system 1004 like the selective catalytic reduction filtration systems discussed above, are configured to reduce nitrogen dioxide gases by oxidizing and converting them into harmless exhaust emissions that are emitted out of the exhaust system 1000 and into the environment without the need to introduce a liquid-reductant agent into the selective catalytic reduction filtration system 1004. The selective catalytic reduction system 1004 includes a filter 1008 that has a plurality of honeycomb shaped openings, is coated with one or more noble metals 1010, includes a plurality of rods 1012 comprised of a metal or alloy that extend longitudinally through the honeycomb structure and a plurality of magnets 1014 arranged within the filter 1008. The heater 1002, rods 1012, metal coating 1010 and magnets 1014 perform the same function(s) as discussed above with regard to the exhaust systems 600-900. It is noted that in addition or instead of the placement of the magnets 1014 within the filter 1008, the magnets 1014 can be arranged adjacent to the filters 1008 and/or external the housing 1006 of the exhaust system 1000.

Figure 30:
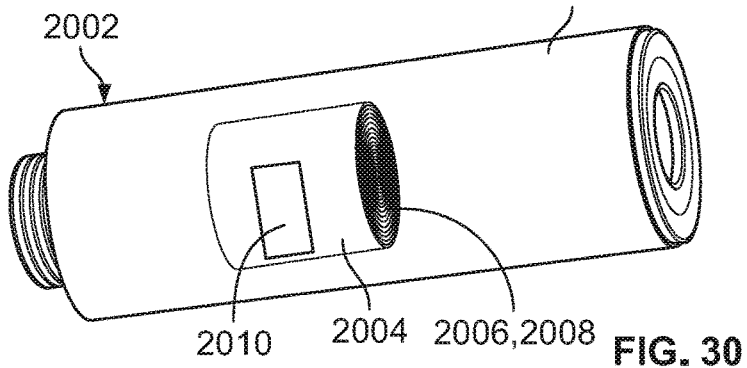
FIG. 30 is a non-battery operated exhaust system.

FIG. 30 depicts an exhaust system 2000 for non-battery operated machinery that utilizes a fossil fuel. As shown, a selective catalytic reduction filtration system 2002, which does not utilize a liquid-reductant agent, includes a filter 2004 that is arranged within a housing 2003 and that has a plurality of honeycomb shaped openings, is coated with one or more noble metals 2006, includes a plurality of rods 2008 comprised of a metal or alloy that extend longitudinally through the honeycomb structure and a plurality of magnets 2010 arranged within the filter 2004. The rods 2008, metal coating 2006 and magnets 2010 perform the same function(s) as discussed above with regard to the exhaust systems 600-1000 with the difference with respect to the system 2000 that the elements are not heated within the housing 2003. It is noted that in addition or instead of the placement of the magnets 2010 within the filter 2004, the magnets 2010 can be arranged adjacent to the filters 2004 and/or external to the housing 2003 of the exhaust system 2000.

The foregoing description and accompanying drawings illustrate principles, exemplary embodiments, and modes of operation of the present invention. However, the present invention should not be construed as being limited to the particular embodiments disclosed herein. Variations to the embodiments discussed above will be appreciated by those skilled in the art without departing from the scope of the invention. Accordingly, the above-described embodiments and accompanying drawings should be regarded as illustrative rather than restrictive.

What is claimed is:

1. A catalytic converter, comprising:
   an external shell;
   an internal shell spaced from the external shell;
   a magnet located between the external shell and the internal shell; and
   a heater arranged within the internal shell that is configured to heat toxic gases and particulate matter that enter the catalytic converter through an inlet port and reduce said gases and particulate matter prior to said gases and particulate matter exiting the catalytic converter through an outlet port,
   wherein the catalytic converter is a component of a vehicle exhaust system.

2. The catalytic converter of claim 1, wherein the magnet is an electromagnet.

3. A catalytic converter, comprising:
   an external shell;
   an internal shell spaced from the external shell;
   a magnet located between the external shell and the internal shell; and
   a heater arranged within the internal shell that is configured to heat toxic gases and particulate matter that enter the catalytic converter through an inlet port and reduce said gases and particulate matter prior to said gases and particulate matter exiting the catalytic converter through an outlet port,
   wherein the catalytic converter is coupled to a smoke stack.

4. A catalytic converter, comprising:
   a housing comprising a first shell and a second shell, the second shell spaced from the first shell;
   a magnet located between the first shell and the second shell; and
   a heater arranged within the housing that is configured to heat toxic gases and particulate matter that enter the catalytic converter through an inlet port and reduce said gases and particulate matter prior to said gases and particulate matter exiting the catalytic converter through an outlet port,
   wherein the catalytic converter is a component of a vehicle exhaust system.

5. The catalytic converter of claim 4, wherein the magnet is an electromagnet.

6. The catalytic converter of claim 4, wherein the first shell surrounds the second shell.

7. The catalytic converter of claim 6, wherein the heater is arranged within the second shell.

8. A catalytic converter, comprising:
   a housing comprising a first shell and a second shell, the second shell spaced from the first shell;
   a magnet located between the first shell and the second shell; and
   a heater arranged within the housing that is configured to heat toxic gases and particulate matter that enter the catalytic converter through an inlet port and reduce said gases and particulate matter prior to said gases and particulate matter exiting the catalytic converter through an outlet port,
   wherein the catalytic converter is coupled to a smoke stack.

9. A catalytic converter, comprising:
   an external shell;
   an internal shell spaced from the external shell;
   a magnet to generate a magnetic field within the internal shell; and
   a heater configured to heat toxic gases and particulate matter that enter the catalytic converter and reduce said gases and particulate matter prior to said gases and particulate matter exiting the catalytic converter,
   wherein the catalytic converter is a component of a vehicle exhaust system.

10. The catalytic converter of claim 9, further comprising a pad located between the internal shell and the heater to insulate heat within the internal shell.

11. The catalytic converter of claim 9, wherein the heater is arranged within the internal shell.

12. The catalytic converter of claim 9, wherein the magnet is an electromagnet.

13. A catalytic converter, comprising:
   an external shell;
   an internal shell spaced from the external shell;
   a magnet to generate a magnetic field within the internal shell; and
   a heater configured to heat toxic gases and particulate matter that enter the catalytic converter and reduce said gases and particulate matter prior to said gases and particulate matter exiting the catalytic converter,
   wherein the catalytic converter is coupled to a smoke stack.

14. A catalytic converter, comprising:
   an external shell;
   an internal shell spaced from the external shell;

a magnet to generate a magnetic field within the internal shell;

a honeycomb filter disposed within the internal shell to slow down the flow of toxic gases and particulate matter from an inlet port to an outlet port of the catalytic converter; and a pad located between the internal shell and the honeycomb filter to insulate heat within the internal shell;

wherein the pad and the honeycomb filter collectively aid in the removal of toxic gases and particulate matter within the catalytic converter, wherein the catalytic converter is a component of a vehicle exhaust system.

15. The catalytic converter of claim 14, wherein the honeycomb filter comprises metallic material.

16. The catalytic converter of claim 15, wherein the metallic material comprises a noble metal.

17. The catalytic converter of claim 14, wherein the magnet is an electromagnet.

18. A catalytic converter, comprising:

an external shell;

an internal shell spaced from the external shell;

a magnet to generate a magnetic field within the internal shell;

a honeycomb filter disposed within the internal shell to slow down the flow of toxic gases and particulate matter from an inlet port to an outlet port of the catalytic converter; and a pad located between the internal shell and the honeycomb filter to insulate heat within the internal shell;

wherein the pad and the honeycomb filter collectively aid in the removal of toxic gases and particulate matter within the catalytic converter, wherein the catalytic converter is coupled to a smoke stack.

* * * * *